(12) United States Patent
Apps et al.

(10) Patent No.: US 10,614,159 B2
(45) Date of Patent: Apr. 7, 2020

(54) METHOD AND SYSTEM FOR GENERATING AND MODIFYING ELECTRONIC ORGANIZATIONAL CHARTS

(71) Applicant: ORGANIMI INC., Waterloo (CA)

(72) Inventors: Eric Apps, Toronto (CA); Brett Shellhammer, Waterloo (CA)

(73) Assignee: ORGANIMI INC., Toronto (CA)

( * ) Notice: Subject to any disclaimer, the term of this patent is extended or adjusted under 35 U.S.C. 154(b) by 340 days.

(21) Appl. No.: 14/400,780

(22) PCT Filed: Mar. 15, 2013

(86) PCT No.: PCT/CA2013/000243
§ 371 (c)(1),
(2) Date: Nov. 12, 2014

(87) PCT Pub. No.: WO2013/170346
PCT Pub. Date: Nov. 21, 2013

(65) Prior Publication Data
US 2015/0135043 A1    May 14, 2015

(30) Foreign Application Priority Data
May 14, 2012 (CA) .................... 2776931

(51) Int. Cl.
*G06F 17/00* (2019.01)
*G06F 17/24* (2006.01)
(Continued)

(52) U.S. Cl.
CPC .......... *G06F 17/248* (2013.01); *G06Q 10/06* (2013.01); *G06Q 10/10* (2013.01); *G06Q 50/01* (2013.01); *H04L 12/6418* (2013.01)

(58) Field of Classification Search
CPC .............................. G06F 17/248; G06Q 50/01
See application file for complete search history.

(56) References Cited

U.S. PATENT DOCUMENTS

| | | | |
|---|---|---|---|
| 5,596,691 A * | 1/1997 | Good | G06T 11/206 345/440 |
| 10,395,326 B2 * | 8/2019 | Markus | G06Q 50/22 |

(Continued)

FOREIGN PATENT DOCUMENTS

| | | |
|---|---|---|
| CA | 2405020 A1 | 10/2001 |
| CA | 2664905 A1 | 4/2008 |

(Continued)

OTHER PUBLICATIONS

Edraw Orgchart, Organizational Chart Basic Knowledge, 2 pages. Retrieved from https://web.archive.org/web/20120501053855/https://www.edrawsoft.com/Organizational-chart.php. Archived on May 1, 2012.*

(Continued)

*Primary Examiner* — Scott T Baderman
*Assistant Examiner* — Barbara M Level
(74) *Attorney, Agent, or Firm* — Conneely PC; Joseph Conneely

(57) ABSTRACT

A method for generating an electronic organizational chart for an organization, comprising: receiving information from a data source relating to the organization; using the information, selecting a template for the organization chart from a template store, wherein the template represents a type of organization; populating the template with the information to generate the electronic organizational chart; and, presenting the electronic organizational chart on a display.

30 Claims, 40 Drawing Sheets

(51) Int. Cl.
*G06Q 10/10* (2012.01)
*H04L 12/64* (2006.01)
*G06Q 50/00* (2012.01)
*G06Q 10/06* (2012.01)

(56) References Cited

U.S. PATENT DOCUMENTS

| | | | |
|---|---|---|---|
| 2004/0111431 A1* | 6/2004 | Zeller | G06F 17/30994 |
| 2005/0131777 A1* | 6/2005 | Davidson | G06Q 10/06 |
| | | | 705/7.36 |
| 2008/0300952 A1* | 12/2008 | Couper | G06Q 10/06 |
| | | | 705/7.13 |
| 2009/0222298 A1 | 9/2009 | Atmaja | |
| 2010/0325218 A1* | 12/2010 | Castro | G06Q 50/01 |
| | | | 709/206 |
| 2012/0260253 A1* | 10/2012 | Gururaja | G06Q 10/0631 |
| | | | 718/102 |
| 2013/0024795 A1* | 1/2013 | Robotham | G06F 3/0486 |
| | | | 715/769 |
| 2013/0198281 A1* | 8/2013 | Scuba | H04L 67/18 |
| | | | 709/204 |
| 2013/0246453 A1* | 9/2013 | Menten | G06F 8/36 |
| | | | 707/769 |

FOREIGN PATENT DOCUMENTS

| | | |
|---|---|---|
| WO | 2004/095337 A1 | 11/2004 |
| WO | 2010/109331 A1 | 9/2010 |
| WO | 2011/140261 A1 | 11/2011 |
| WO | WO 2011140261 A1 * | 11/2011 ........... G06Q 10/105 |

OTHER PUBLICATIONS

International Searching Authority (ISA/CA), International Search Report and Written Opinion, dated Jul. 17, 2013, for corresponding International Patent Application No. PCT/CA2013/000243.

* cited by examiner

FIG. 5

A Web Page

[Edit Organimi Settings] [Create a New Organimi] [Add a Person]

| Organimi's That I Administer | Last Updated | Public |
|---|---|---|
| Company A | 8-Mar-2012 | ☑ |
| Company B | 18-Feb-2012 | ☐ |
| Project Team Alpha | 28-Jan-2012 | ☐ |

| Organimi's That I Belong To | Last Updated |
|---|---|
| Company A | 8-Mar-2012 |
| Company B | 10-Feb-2012 |
| Company C | 8-Feb-2012 |
| Company D | 8-Feb-2012 |
| Beechwood West 2 Home Owners Organization | 28-Jan-2012 |
| Fall Hockey Team | 12-Oct-2012 |

My Connections
- Bill Adores, Waterloo, ON
- Bill Adores, Waterloo, ON
- Bill Adores, Waterloo, ON
- Leslie Brown, San Francisco
- Leslie Brown, San Francisco

[See My View of The World]

500

Create a New Organimi — 600

A Web Page (Choose a Template from the list or create from Scratch)

Type of Organization: Non-Profit

☑ Has a Board or Directors?

Template for Organization: Non-Profit Large (could be none)

Name: Organization Name

Location 1 / Location 2 / Location 3
- Address 1
- Address 2
- City / State/Prov
- Postal / Country An Organization can have multiple locations so this field should show in the pull down

Location Phone: +1 (888) 555-1212

Organization Website: http://www.organimi.com
Facebook Page: http://www.organimi.com
Linked In Profile: http://www.organimi.com
Field: http://www.organimi.com
Field: http://www.organimi.com
Field: http://www.organimi.com

[ Create ]  [ Cancel ]

| Organization Templates | Private |
|---|---|
| Regional Bank Small Banking Org | ☑ |
| Non-Profit Large Over 1000 employees | ☐ |
| Software Company Startup Sized | ☐ |
| Manufacturing Organization Single site under 50 employees | ☑ |
| Neighbourhood Association with a board | ☐ |

FIG.6

Create a New Role (Choose a Template from either list or create from Scratch)

| | |
|---|---|
| Title | Sr. Software Engineer |
| Description | Description |
| Location | Location 1 |
| Duties: | Description |
| Qualifications | Description |
| Job Code | Grade 7A |
| Salary Range | |
| Role Badges | Screen Master |

☑ Save as Template for Organization
☐ Publish as Template to Web

[Create] [Cancel]

Organization name Role Templates | Private
---|---
Sr. Software Engineer Grade 7A | ☑
Director Software Development Grade 105 | ☐
Administrative Assistant 1 Grade 3A | ☐
Customer Success Rep Grade 6A | ☑
Receptionist Grade 2A | ☐

Crowd Sourced Role Templates
🔍 Search
Sr. Software Engineer
09-May-2012
Director Software Development
09-May-2012
Administrative Assistant 1
09-May-2012
Customer Success Rep
09-May-2012
Receptionist
09-May-2012

Input

Insert a URL

Insert the Industry from the pull down menu

FIG. 31

Slide 2

EA1

Note that a "Director" where inside a list of "Directors" as in "Board of Directors" is very different from a "Director" as a mid level managerial title So a heuristic rule would be Director is an operational mid level role unless the scraper finds the information on a web page entitled Board of Directors in which case all of the people listed under the Board of Directors header all belong in one org chart called the Board of Directors.
Eric Apps, 2013-03-06

FIG. 32 (continued)

| Slide 3 | |
|---|---|
| EA2 | This is an initial score based on the quality of the information provided.<br>If all the information pulled is good and clear it may be possible to get faster results by by-passing next few steps and going directly to "Paint" step |
| EA3 | You evaluate the individual record and also evaluate all of the associated / related records that came on that pull. You are trying to (a) place the person in the correct space on the chart (level, department, etc); and (b) also place the person in the correct space relative to all other records identified. |
| EA4 | This is generating an org chart in the Organimi system that can be manipulated; but it is internal only; not an exposed record for external / public viewing |
| EA5 | This is a secondary adaptive learning process.<br>Refreshes of the learning database make the indexes better over time -for example, reflecting / recognizing industry structures and variations in organizational models |
| EA6 | This is an interactive learning process<br>The internal private org chart made by the machine<br>is tweaked by the human operator<br>The revised chart is compared against the original by the machine for learning opportunities<br>The learnings are reflected in the "learn" DB as more advanced filters l rules etc for structuring the data |
| | This is basically a metadata library of organizational models and relationships |

FIG. 33 (continued)

beta

Find an Organization here

Upload an Organization here beta

Connect·Collaborate·Communicate

Find an Organization

Organization Name : [          ]

Organization Location : [          ]

Your email for results : [          ]

beta

Connect·Collaborate·Communicate

Upload an Organization

Upload Visio (.vsd) file : _____

Upload Excel (.csv) file : _____

Upload Adobe (.pdf) file : _____

Your email for results : _____ beta
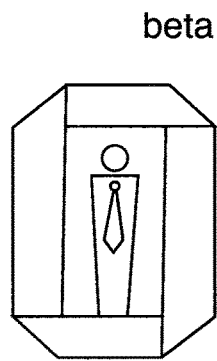
Thanks. We're processing your request. You will be notified at [insert their email address] within [48 hours].
The Orgamini Team.
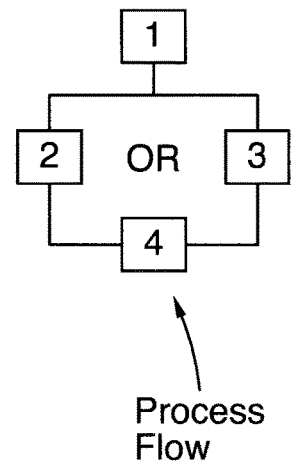
Process Flow
FIG.38

METHOD AND SYSTEM FOR GENERATING AND MODIFYING ELECTRONIC ORGANIZATIONAL CHARTS

This application claims priority from Canadian Patent Application No. 2,776,931, filed May 14, 2012, and incorporated herein by reference, and is a national phase entry of International Patent Application No. PCT/CA2013/000243, filed Mar. 15, 2013, and incorporated herein by reference.

FIELD OF THE INVENTION

This invention relates to the field of electronic organizational charts, and more specifically, to a method and system for generating and modifying electronic organizational charts.

BACKGROUND OF THE INVENTION

Modern societies give rise to a wide variety of organizations. These include workplace organizations (e.g., companies, partnerships, buying groups among organizations, trade unions and industry associations, supplier groups, etc.) as well as non-business organizations (e.g., sports teams, clubs and special interest groups, volunteer agencies and associations, religious groups, charities, etc.). Political organizations including legislative, executive and judicial branches of government, as well as their agencies, departments, and other institutions may also be considered as organizations. All of these types of organizations are dynamic, with constantly changing constellations of individual participants, particularly in the case of private enterprises, as a result of ongoing business acquisitions, combinations or failures, all of which result in changes in organizational structures and relationships. Typically, an organizational chart in either paper or electronic form has been used to present an overview of an organization's structure.

Most individuals define themselves, at least in part, by reference to the organizations they participate in. Historically, organizations and relationships among individuals within and between them were limited, local and physical. In modern times, with the advent of globalization, with the reduction in communications costs, with the emergence of pervasive interconnectedness through the means of the Internet, and with the resulting shift in emphasis from solely physical to virtual relationships, the range, breadth and diversity of organizations and the relationships they create, are now significantly enlarged. As an example, the social networking site Facebook™ itself is an organization having at least 500 million members worldwide and with some degree of interconnectedness between and among its members. As a related example, many businesses can now be incorporated electronically, can be staffed remotely by "virtual" employees, and can be operated entirely by using "cloud-based" business applications to connect with employees, customers and suppliers.

This organizational diversity results in significant complexity. This complexity is heightened when one considers that many individuals are participants interacting with multiple workplace organizations, and are also active in many non-business organizations. These trends affect all individuals. They also present challenges with respect to organization, communication and interaction that grow as organizations expand to transnational scope.

One drawback with current organizational charts, tools and methods for helping individuals better understand the structure of and manage their interactions with specific organizations while coping with changes in these organizations is that they offer limited and often primitive functionality. They have not kept pace with technological change and innovation. In particular, paper based organizational charts of the type typically found in many companies and posted on office walls are may be difficult to maintain and keep up-to-date. In addition, tools and methods to enable individuals to efficiently manage their simultaneous participation across multiple organizations are not available.

Recent developments in the areas of so-called cloud-computing, social networks and the mobile Internet have created opportunities to address all of these gaps with improved tools and methods for the benefit of both organizations and the individuals who serve in or interact with them. Internet based computing has evolved in recent years to permit the delivery of a multitude of services to organizations and individuals using cloud-based or software-as-a-service hosting and delivery models. These systems enable, among other things, end user access via a web browser to services where the underlying data and applications are supported in and delivered from remote environments. These applications are designed and deployed to support multiple types of users and levels of access to functionality and features. By implementing these systems using "multi-tenant" architectures, solution providers enable the cost effective delivery of these services with low data storage costs and high levels of availability and scalability. These developments have been enhanced through the enablement of online communities, or "social networks", permitting users of these services to create online connections whether resulting from shared interests, or mutual need for cooperation or collaboration. Social communities, cooperative business relationships, and professional associations are all examples of social networks. Social networking systems create connected networks of individuals that can be used to share knowledge, as well as to create and strengthen the communities themselves. For example, a person may receive an invitation from a friend or colleague to join a social network or decide to join independently where they find a social network relevant to their interests and needs, whether professional or personal. Typically, a user will create an account, provide whatever information about themselves that they wish to share, and collaborate (through the medium of the application or service) with others within the community. Social networks have been shown to be a significant contributor in assisting in organizing online communities. With the proliferation of smart phones and other mobile computing devices, as well as the emergence of low cost broadband access across a diverse array of wireless networks, there is increased opportunity and ability for users to establish and maintain their "connectedness" to organizations and each other not simply through the use of traditional desktop tools to access the Internet but also through a growing range of wireless appliances enabling such access.

However, current tools and methods for generating organizational charts have not taken effective advantage of these technological improvements.

A need therefore exists for an improved method and system for generating and modifying electronic organizational charts. Accordingly, a solution that addresses, at least in part, the above and other shortcomings is desired.

SUMMARY OF THE INVENTION

According to one aspect of the invention, there is provided a method for generating an electronic organization chart for an organization, comprising: receiving information from a data source relating to the organization; using the information, selecting a template for the organization chart from a template store, wherein the template represents a type of organization; populating the template with the information to generate the electronic organizational chart; and, presenting the electronic organizational chart on a display.

In accordance with further aspects of the present invention there is provided an apparatus such as a data processing system or a wireless device, a method for adapting these, as well as articles of manufacture such as a computer readable medium or product having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which:

FIG. 5 is a screen capture illustrating an administration screen in accordance with an embodiment of the invention;

FIG. 6 is a screen capture illustrating a chart creation screen for constructing a new organizational chart or structure in accordance with an embodiment of the invention;

FIG. 7 is a screen capture illustrating a role creation screen in accordance with an embodiment of the invention;

It will be noted that throughout the appended drawings, like features are identified by like reference numerals.

DETAILED DESCRIPTION OF THE EMBODIMENTS

In the following description, details are set forth to provide an understanding of the invention. In some instances, certain software, circuits, structures and methods have not been described or shown in detail in order not to obscure the invention. The term "data processing system" is used herein to refer to any machine for processing data, including the computer systems, wireless devices, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

Figure 19:
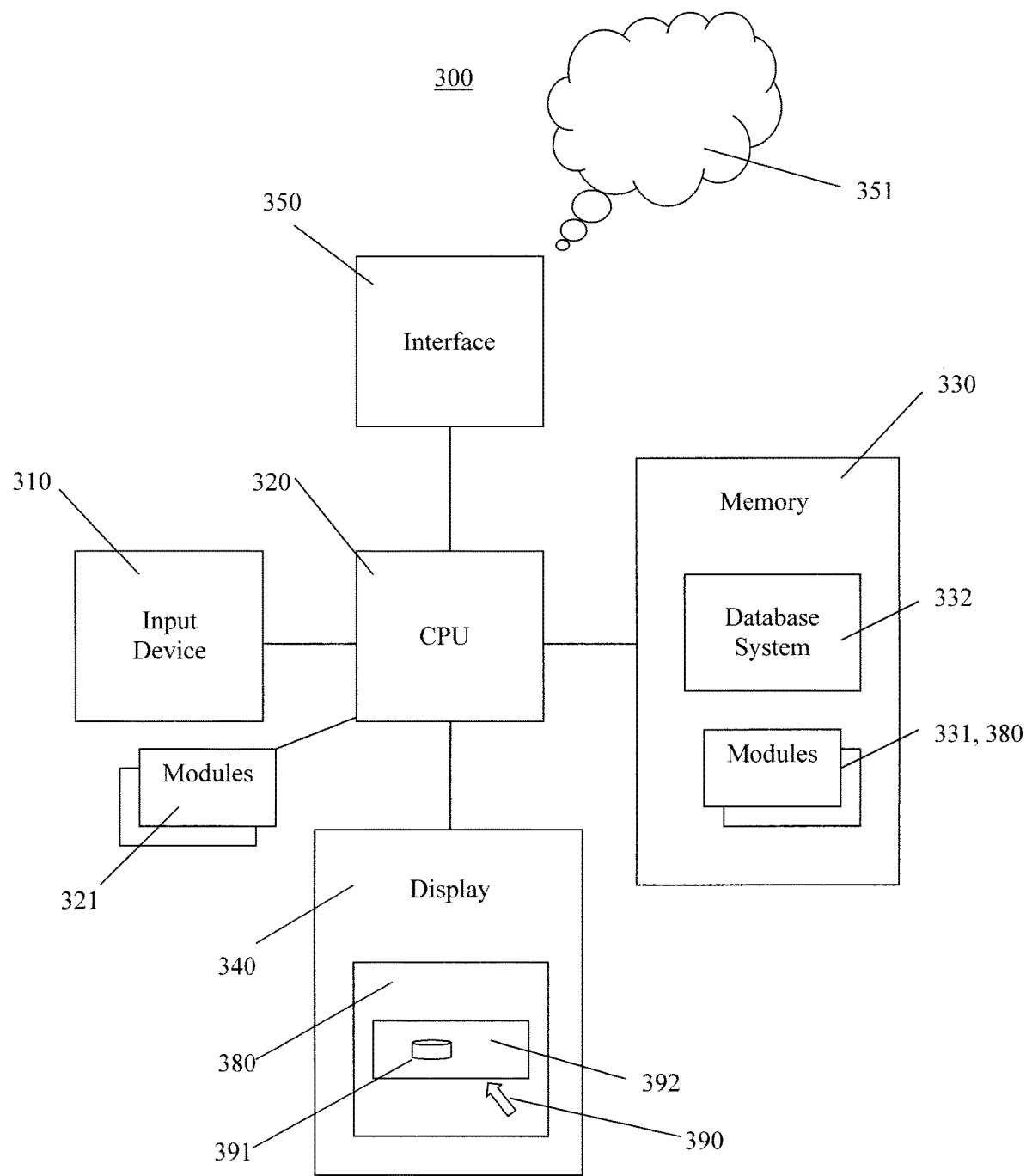
FIG. 19 is a block diagram illustrating a data processing system in accordance with an embodiment of the invention.

FIG. 19 is a block diagram illustrating a data processing system 300 in accordance with an embodiment of the invention. The data processing system 300 is suitable for generating electronic organizational charts. The data processing system 300 is also suitable for generating, displaying, and adjusting presentations in conjunction with a graphical user interface ("GUI"), as described below. The data processing system 300 may be a client and/or server in a client/server system. For example, the data processing system 300 may be a server system or a personal computer ("PC") system. The data processing system 300 may also be a wireless device or other mobile, portable, or handheld device. The data processing system 300 includes an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, the Internet, etc.). As such, the interface 350 may include suitable transmitters, receivers, antennae, etc. In addition, the data processing system 300 may include a Global Positioning System ("GPS") receiver. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 (or store) for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., a compact disk ("CD"), a floppy disk, etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a graphical user interface ("GUI") 380 (and related GUI software modules 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

According to one embodiment, the present invention provides a method and system for the capture, management and display of organizational relationships and associated information for individuals across a multitude of organizational types within a single unified environment.

Figure 1:
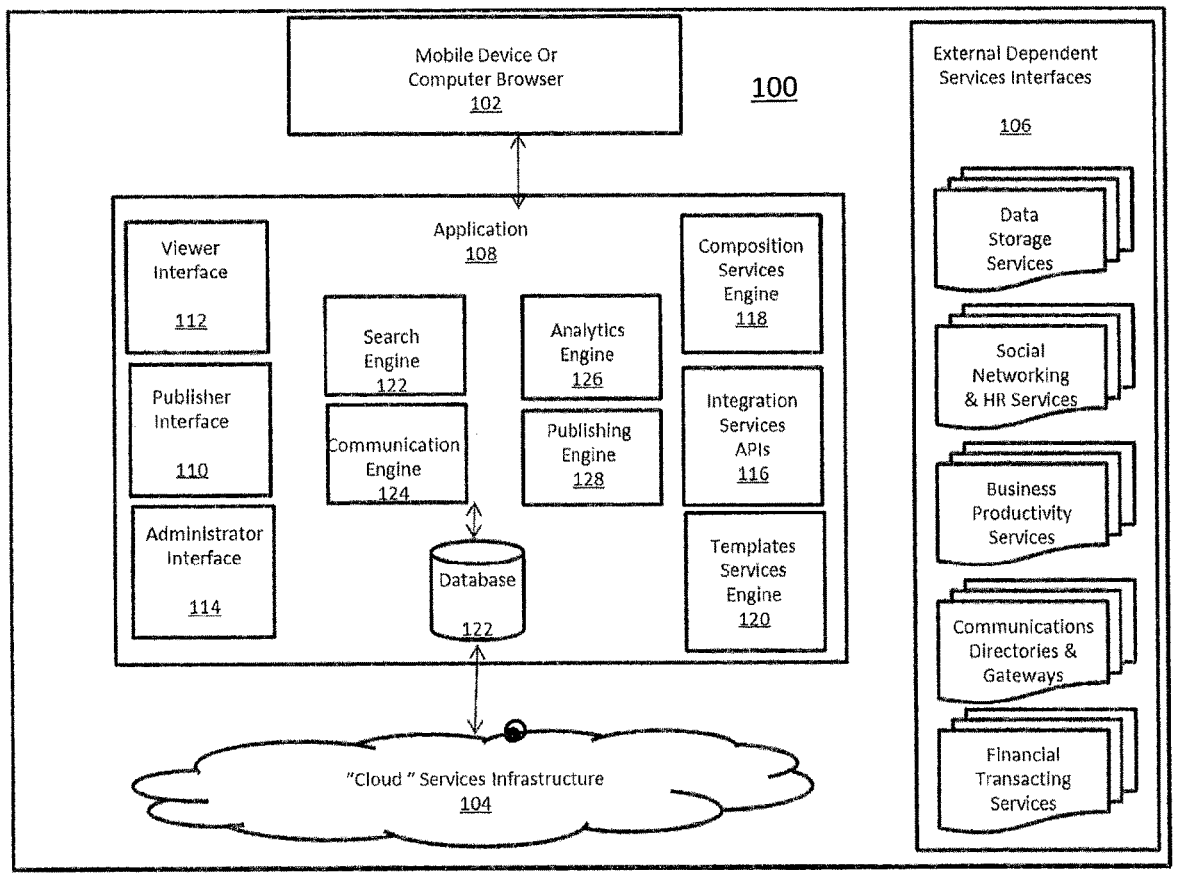
FIG. 1 is a block diagram illustrating a network topography for implementing an organizational chart application module in accordance with an embodiment of the invention.

FIG. 1 is a block diagram illustrating a network topography 100 for implementing an organizational chart application module 108, 331 in accordance with an embodiment of the invention. The organizational chart application 108 may be one of the modules 331 stored in the memory 330 of the system 300. In FIG. 1, a browser 102 located in a data processing system 300 may access the application 108. Since the browser 102 is independent of the application 108, the system 300 may be deployed in a number of different environments and be accessible at all times from any computing device of any type (e.g., 300) that is able to access the Internet (e.g., 351). Thus, for example, the application 108 may be hosted in a cloud-based infrastructure environment 104. Similarly, the application 108 may be integrated with, connect to, and exchange data and other services with a plurality of other applications 106 including both internally developed applications within an organization using this system 300, as well as commercial off the shelf software programs containing application programming interfaces permitting such exchange, which are numerous, and other cloud-based computing services and utilities, such as Google™, Facebook™, LinkedIn™, Twitter™, Salesforce.com™, DropBox.com™, and others that permit access to their systems by other applications. Since the cloud-based infrastructure environment 104 contains numerous servers which may be divided among primary hosts serving a number of local clients with central servers interconnecting to a number of primary hosts and/or serve various remote clients, the system 300 is designed to support scaling to hundreds of millions of end users concurrently. It should be understood that any number or configuration of these computer-based components may be used in various embodiments of the present invention. Further, some or all of these components may exist on mobile platforms, such as handheld computer systems and the like, and in peer-to-peer platforms. The network 351 may be a portion of a much larger computer network or networks, such as a corporate enterprise network, or even the Internet. The clients 300 and various servers 300 used to support the application 108 may be combinations of hardware and/or software modules 321, 331 configured in accordance with the present invention.

The application 108 supports user interaction through at least three primary means, with GUIs 380 designed to support these usage requirements. First, a viewer interface 112 permits a user of the application 108 to be authenticated and thereby view the information available to them about the organizations of which they are members. Second, a publisher interface 110 enables a user of the application 108 to create and manipulate artifacts and structures maintained within the application 108. These would include for example, creating templates for organizational structures that may be uploaded to the application 108 for their own use or for the use of others, as well as creating organizational charts for specific organizations they are members of, or providing other content relevant or useful to other users of the application 108. Third, an administrator interface 114 enables a user with appropriate authorization to assume responsibility for the application 108 from the point of view of administering user access permissions, membership, data access rights, security and other features of the operation of the application 108 while also serving to curate content, including editing, removing or adding it. Illustrative examples of the features and functionality that may be supported by all or any of these interfaces are set out in FIGS. 5 through 10 and are described below.

According to one embodiment, usage of the application 108 is streamlined through the availability of pre-configured templates 1750 reflecting a number of common organizational structures, such as a corporation, a partnership, a foundation, a university, a charity, a community group, a sports team, a volunteer organization, a religious group, and other commonly encountered organizations. These templates 1750 can be stored and managed within the application using a template service engine 120 that enables templates 1750 to be edited, updated and made available for users. Templates 1750 can be contributed from a variety of sources including by those involved in the organizations themselves, as well as by individuals outside of the organization, such as consultants or others who wish to contribute templates and associated best practices for organizational development, whether on a voluntary basis or as paid content. Since an individual may be a member of many different organizations simultaneously, and since the system 300 permits individuals to elect to expose or conceal all or certain elements of the individual data they share within and across organizations, a composition services engine 118 is provided to manage the assembly and display of this information across multiple systems, organization and user communities.

Similarly, the application 108 contains additional program modules 331 which support the features and functionality requirements of users. For example, a publishing engine 128 enables users to publish and display content of different digital formats (e.g! documents, audio, visual, other media files, etc.) with other connected users. An analytics engine 126 allows users of the application 108 to track and monitor user activities such as postings, document sharing, collaboration, mentoring and other supported capabilities. A search engine 122 allows users of the application 108 to access and organize information obtained both within and outside the organization being mapped. A communication engine 124 facilitates communication among members of the organizations that have been mapped, including two-way and multi-party instant messaging and audio files containing member related information such as correct pronunciations of names and other personal information. The communication engine 124 may support completely integrated, dynamic, and interactive communications between individuals.

Figure 2:
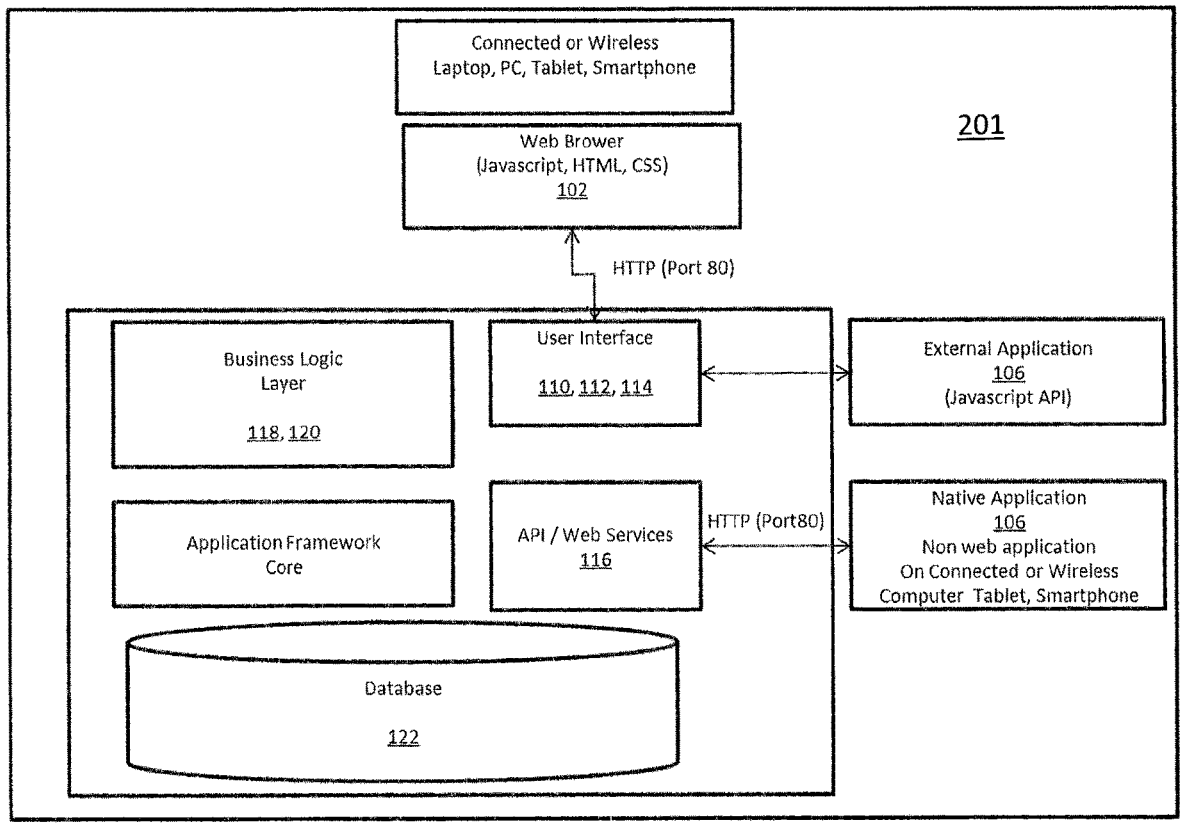
FIG. 2 is a block diagram illustrating an application architecture and framework in accordance with an embodiment of the invention.

FIG. 2 is a block diagram illustrating an application architecture and framework 201 in accordance with an embodiment of the invention. The application architecture and framework 201 includes: a website/browser 102 created using JavaScript™, HTML, CSS, and/or other development tools, accessing the various user interfaces 110, 112, 114, 380, 331 supported by the application 108 for viewers of application displays, publishers or creators of application artifacts such as organizational charts and hierarchies, and administrators of the system; user roles and privileges and related administrative and maintenance tasks, access to third party application and systems 106 through browser interactions for display and system level access via web services 116; business logic services layer 118, 120 supporting composition, visualization, analytics and other engines to support the processing and display of information; and, the application framework and database 122, 332, including associated database schema for the application.

Figure 3:
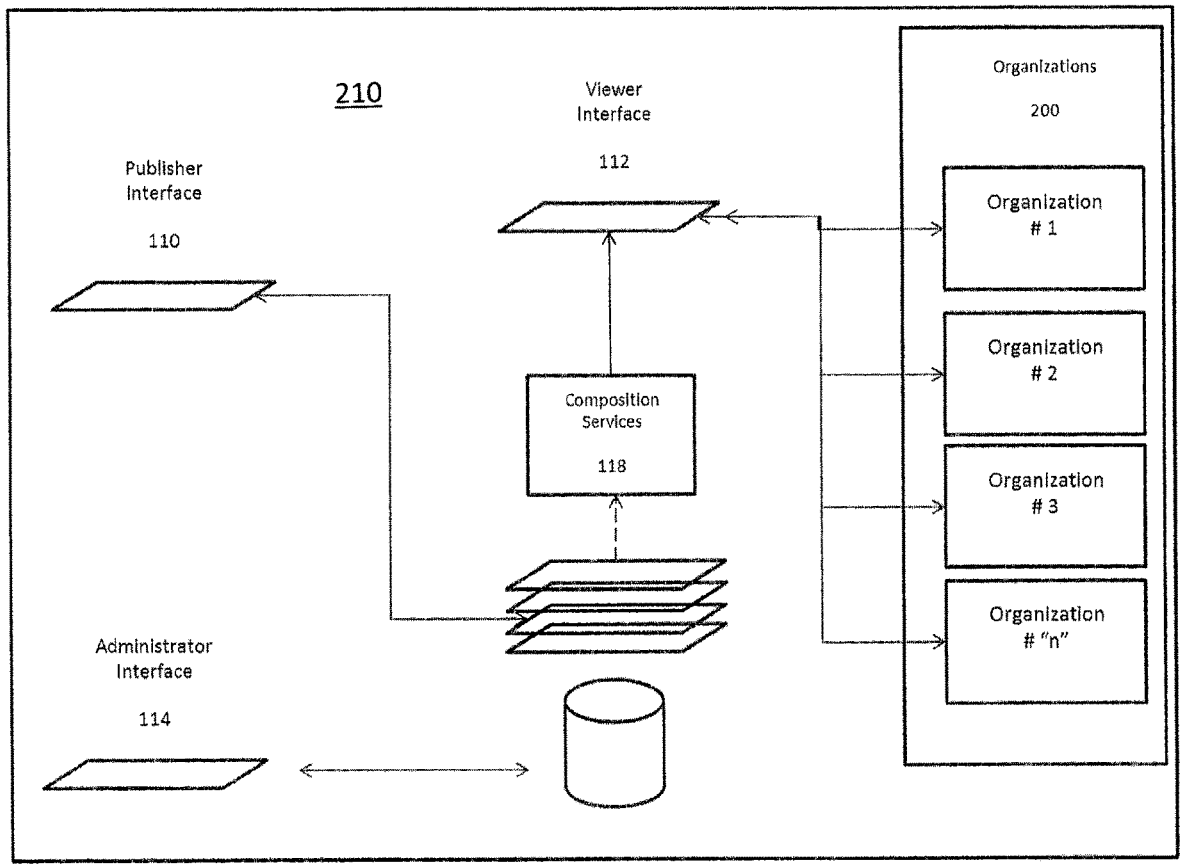
FIG. 3 is a block diagram illustrating a software architecture for supporting methods in accordance with an embodiment of the invention.

FIG. 3 is a block diagram illustrating a software architecture 210 for supporting methods in accordance with an embodiment of the invention. The software architecture includes: (a) a publisher interface 110 for a user creating profiles in the application 108, including creation and selection of preconfigured templates 1750; (b) an administrative console 114 for managing user roles, access permissions and integration with other applications and systems; and, (c) a view interface 112 illustrating an example of various organizational connections a particular user may have established within the application 108 at any specific time, including features enabling the individual to permit the sharing of these connections and the information associated with them, across multiple organizations 200 (by using the functionality of the application 108, the user may create and manage 118 multiple organizational relationships, choosing which information to share and display across each of those organizations).

Figure 4:
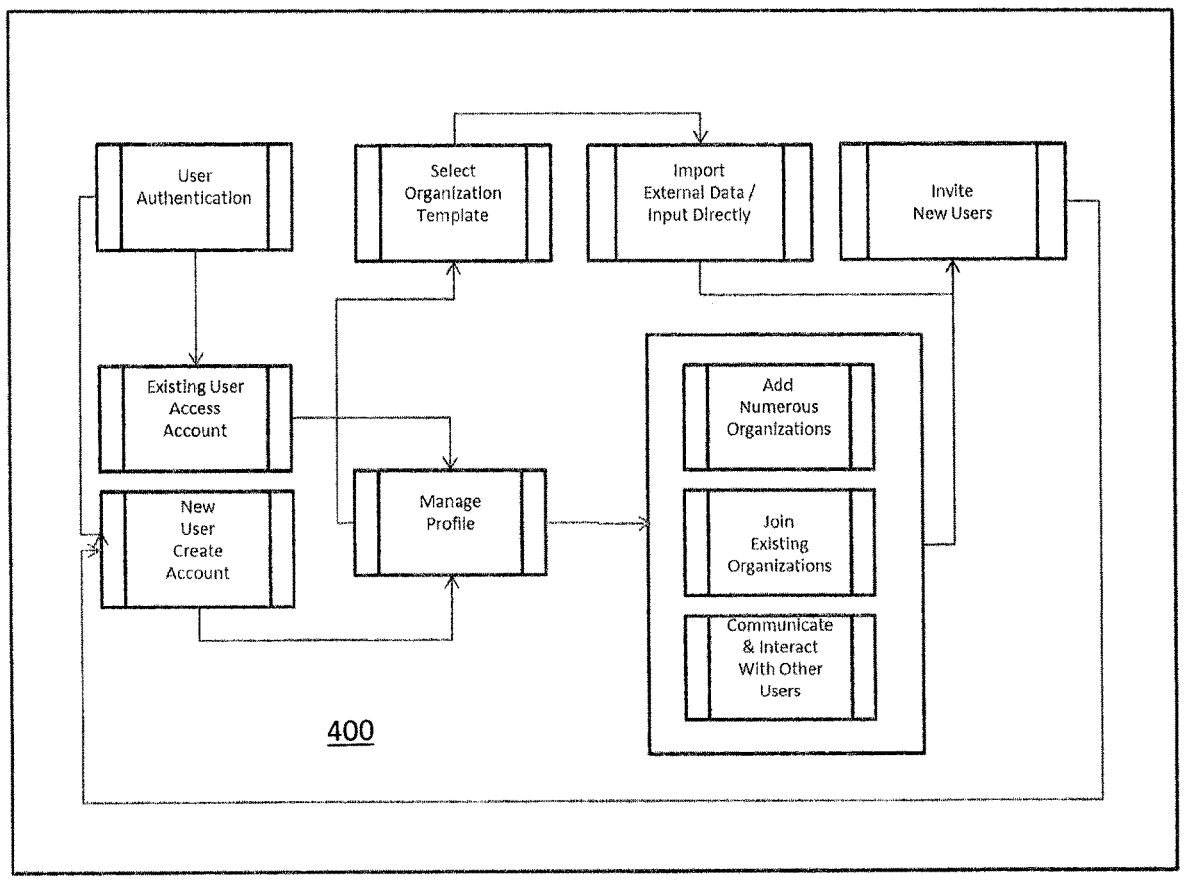
FIG. 4 is an overview flow chart illustrating operations of modules within a data processing system for generating an electronic organizational chart in accordance with an embodiment of the invention.

FIG. 4 is an overview flow chart illustrating operations 400 of modules 331 within a data processing system 300 for generating an electronic organizational chart in accordance with an embodiment of the invention. Referring to FIG. 4, a new user may create an account on the system 300, select from available features supported including managing their profile within the application 108 for those organizations they have already created, create new organizations with or without using predefined templates 1750 provided, import data from external files, applications and data sources, invite a user to join the community for any organization and create their own account, and interact with multiple users (similarly, existing users may exercise the functionality of these applications).

FIG. 5 is a screen capture illustrating an administration screen 500 in accordance with an embodiment of the invention. The administration screen (or window) 500 allows an authenticated user to administer their profile, add new users to existing organizational charts, create new charts, or display information that they are managing. The administration screen 500 may be a part of the graphical user interface ("GUI") 380, 331 of the data processing system 300.

FIG. 6 is a screen capture illustrating a chart creation screen 600 for constructing a new organizational chart or structure in accordance with an embodiment of the invention. The new organization chart or structure may be created using an existing template or may be built from scratch using the chart creation screen (or window) 600.

FIG. 7 is a screen capture illustrating a role creation screen 700 in accordance with an embodiment of the invention. The role creation screen (or window) 700 may be used for entering a new individual into the system and for including information with respect to their title, responsibilities, qualifications, and other useful information about them.

Figure 8:
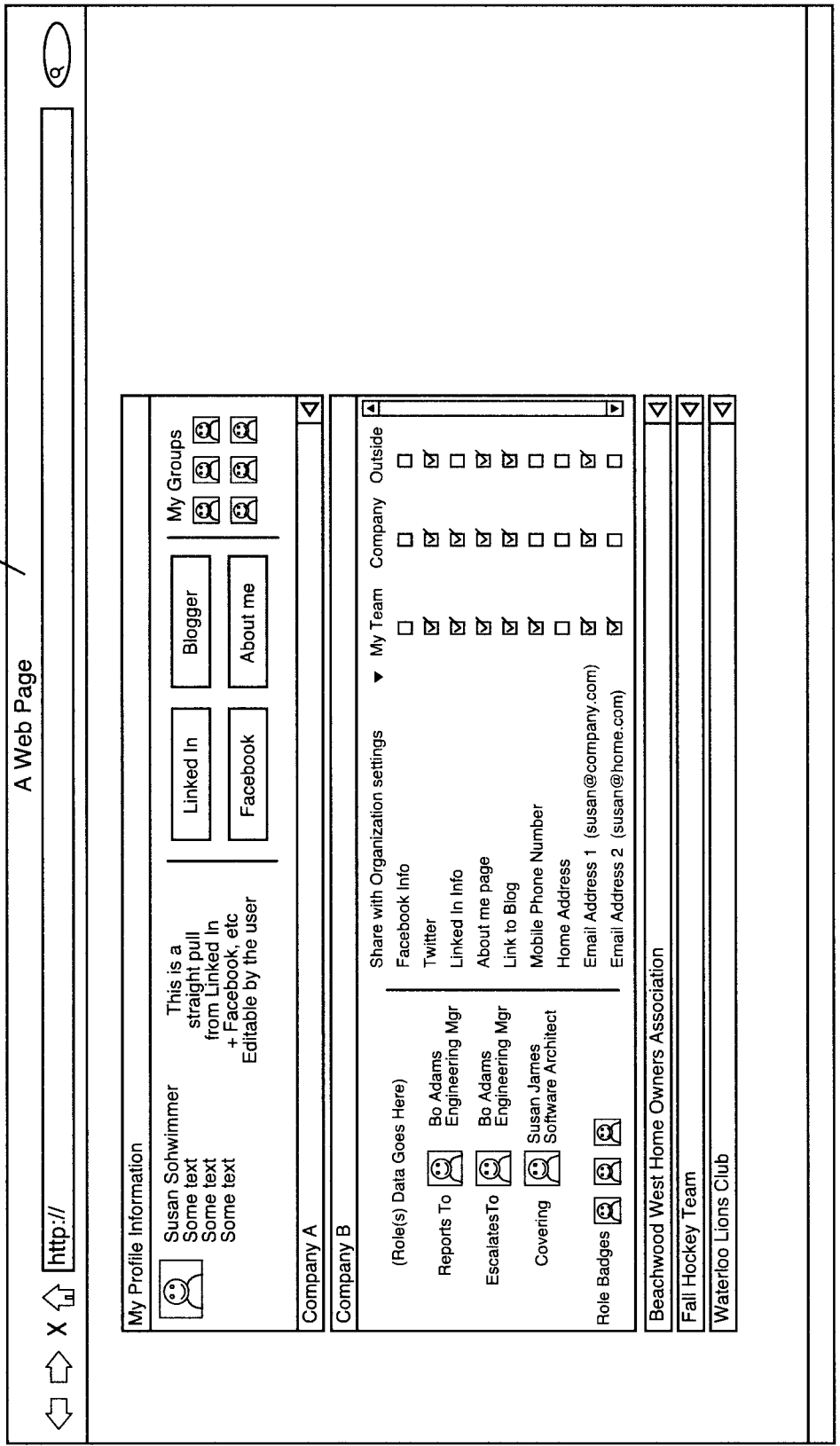
FIG. 8 is a screen capture illustrating a profile information screen in accordance with an embodiment of the invention.

FIG. 8 is a screen capture illustrating a profile information screen 800 in accordance with an embodiment of the invention. The profile information screen (or window) 800, or individual's user interface screen, displays all of the user's organizational relationships in either maximized or minimized formats within a single browser view.

Figure 9:
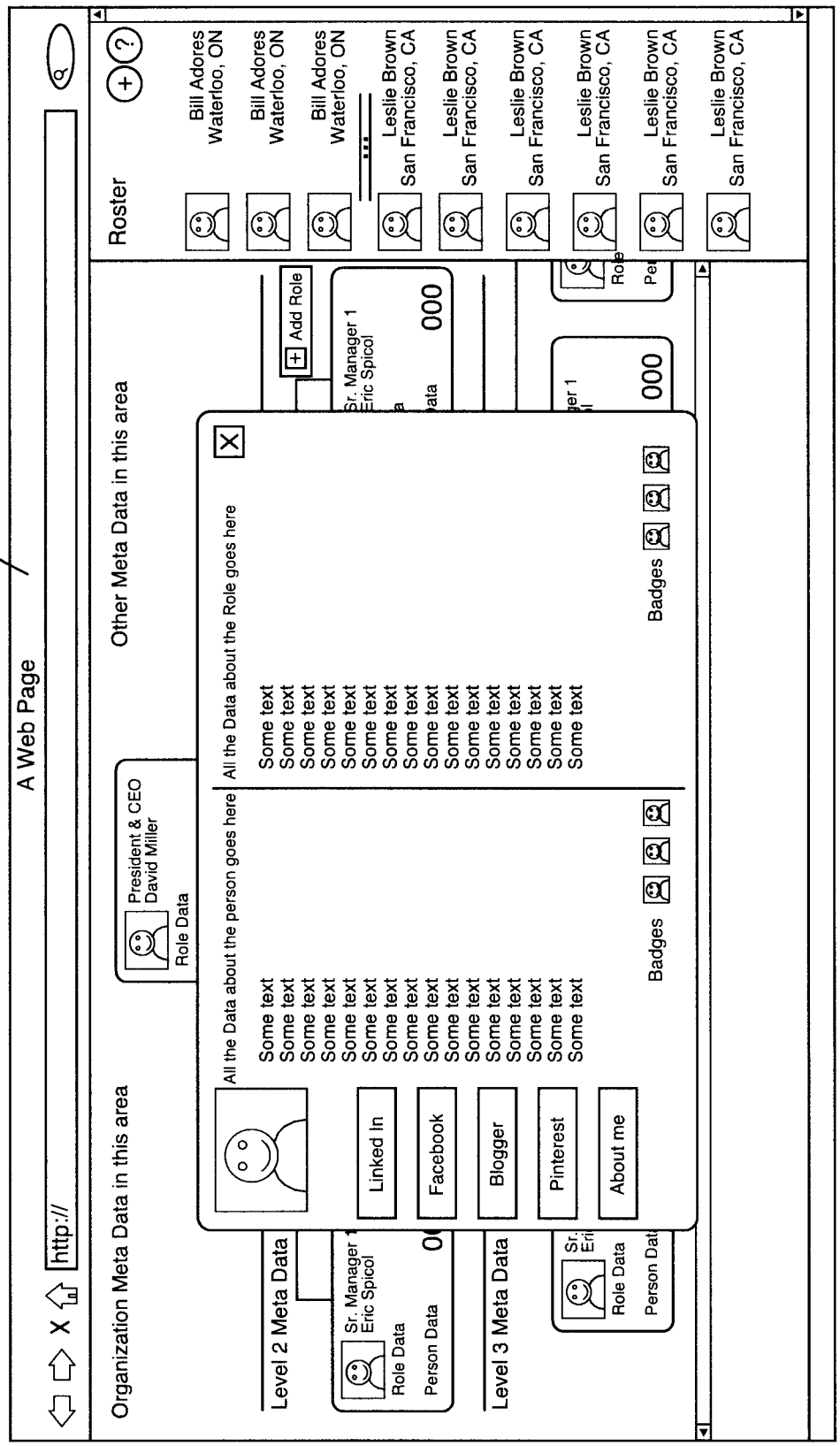
FIG. 9 is a screen capture illustrating an information importation screen in accordance with an embodiment of the invention.

FIG. 9 is a screen capture illustrating an information importation screen 900 in accordance with an embodiment of the invention. The information importation screen (or window) 900 may be used for importing and organizing information from a plurality of external systems and sites, including text files, comma-separated value ("CSV") files, application programming interface ("API") calls to external applications such as LinkedIn™, Facebook™, and other sites containing user information.

Figure 10:
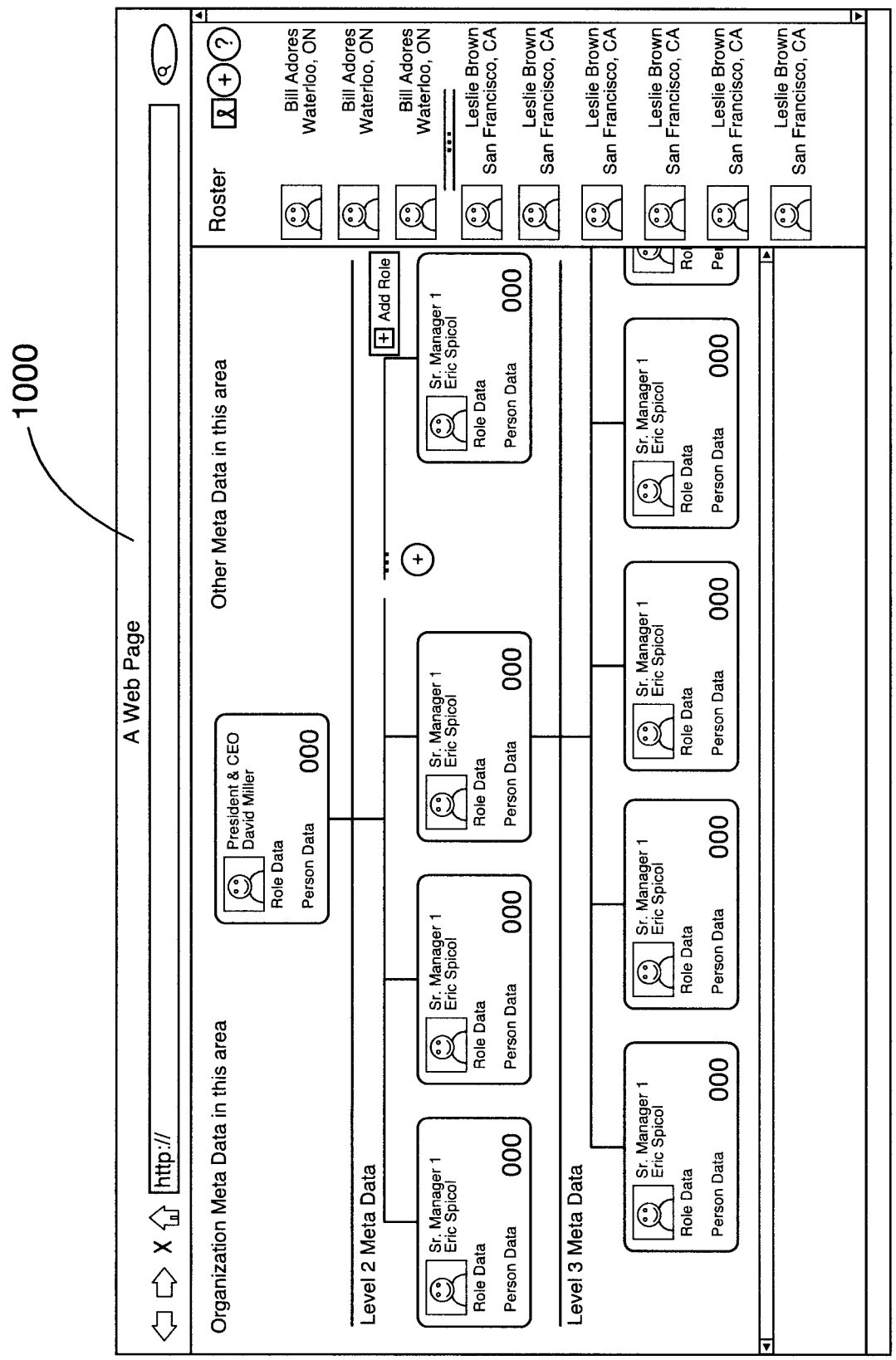
FIG. 10 is a screen capture illustrating an editing screen in accordance with an embodiment of the invention.

FIG. 10 is a screen capture illustrating an editing screen 1000 in accordance with an embodiment of the invention. The editing screen (or window) 1000 may be used for adding new connections and relationships from within the application 108 as a user navigates and interacts with hierarchies represented in the application 108.

Figure 11:
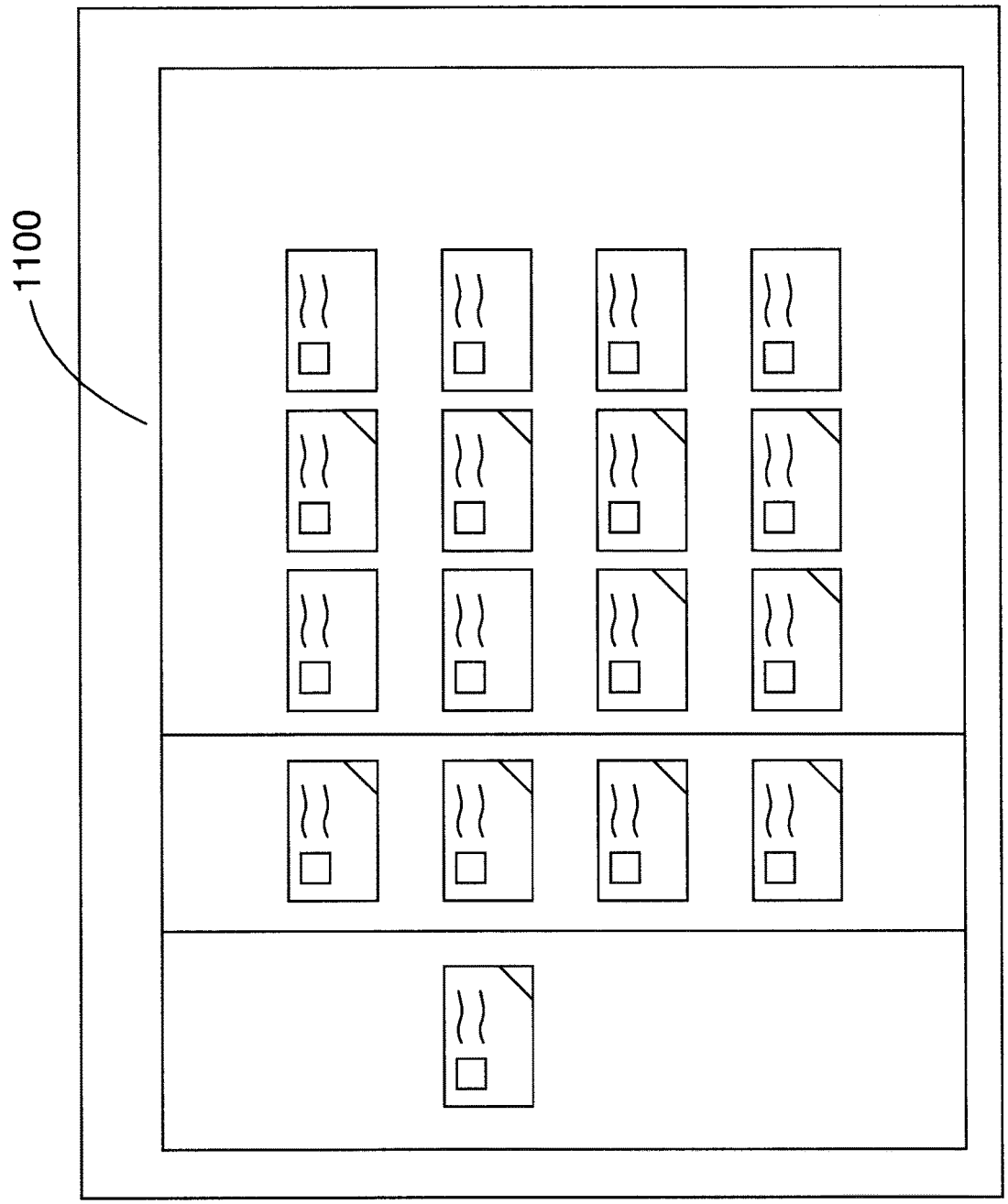
FIG. 11 is a screen capture illustrating a horizontal organizational chart presentation in accordance with an embodiment of the invention.

FIG. 11 is a screen capture illustrating a horizontal organizational chart presentation 1100 in accordance with an embodiment of the invention. In this organizational chart (or structure) 1100, all persons at level C are displayed along with their reporting relationship to level B and to level A. This chart 1100 is a decision tree type chart. The organization chart presentation 1100 may be displayed on the display screen 340 of the system 300. For simplicity, the term "organizational chart" and the reference character 1100 will be used herein to indicate both the data representing the organizational chart or structure (i.e., the organization chart representation) and the presentation of that data on the display screen 340 (i.e., the organizational chart presentation).

Figure 12:
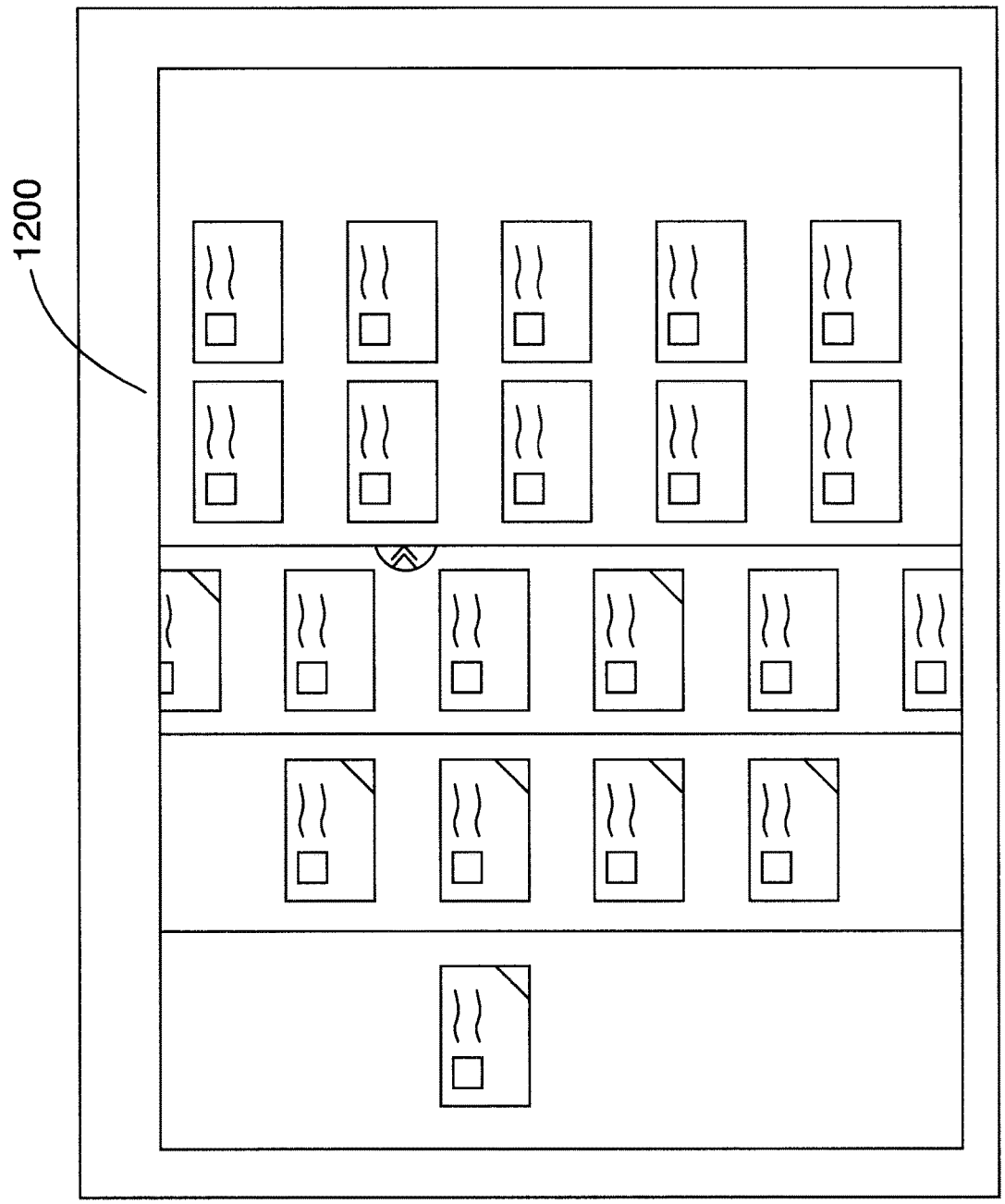
FIG. 12 is a screen capture illustrating an expanded organizational chart presentation in accordance with an embodiment of the invention.

FIG. 12 is a screen capture illustrating an expanded organizational chart presentation 1200 in accordance with an embodiment of the invention. In this organizational chart (or structure) 1200, all persons reporting to a selected person at level C in FIG. 11 are displayed.

Figure 13:
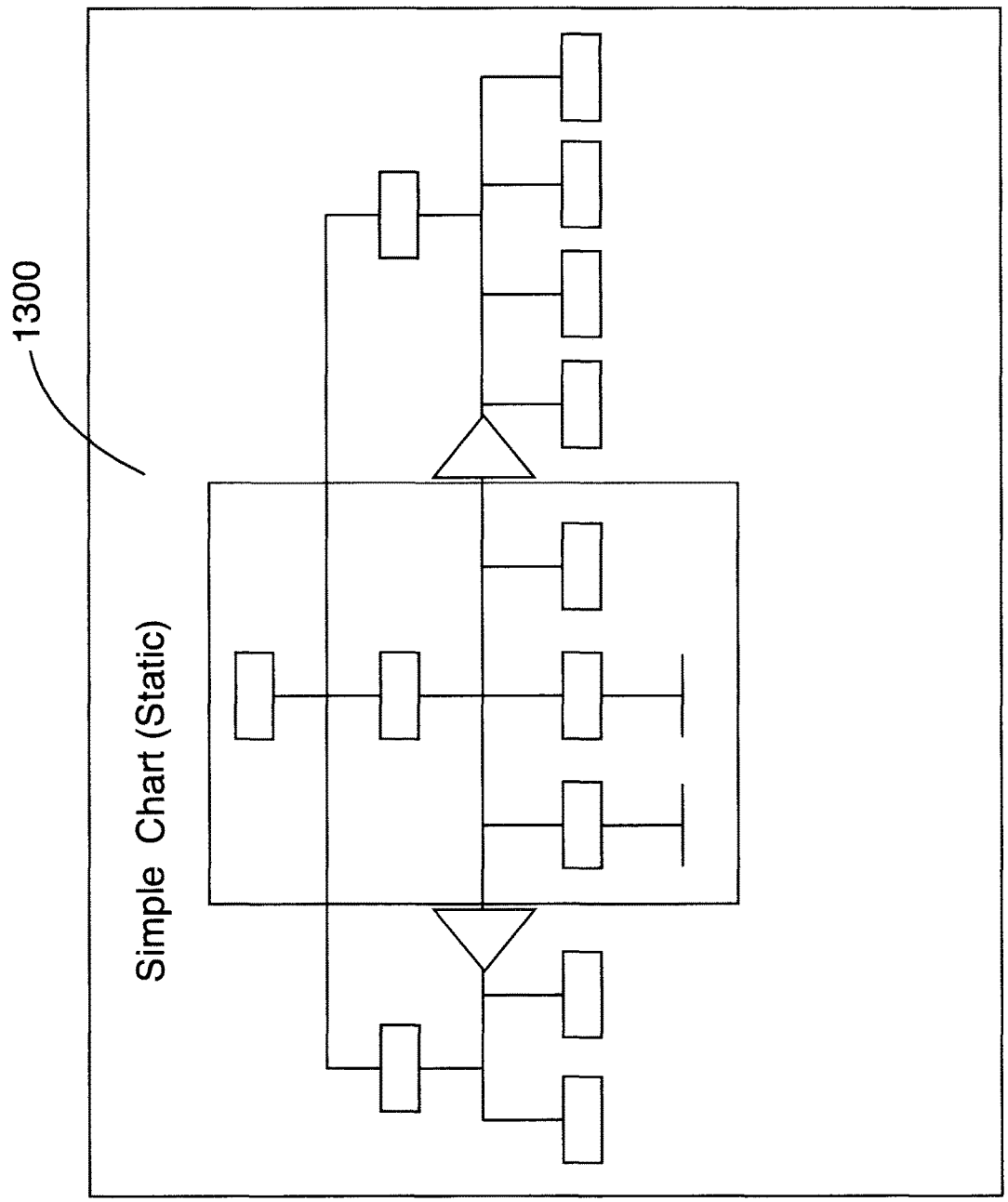
FIG. 13 is a screen capture illustrating navigational aid tools in accordance with an embodiment of the invention.

FIG. 13 is a screen capture illustrating navigational aid tools 1300 in accordance with an embodiment of the invention. The navigational aid tools 1300 allow for traversing organizational hierarchies wherein the underlying content is displayed as the user travels through the organizational structure. In FIG. 13, a simple organizational chart is displayed along with the navigational aid tools 1300.

Figure 14:
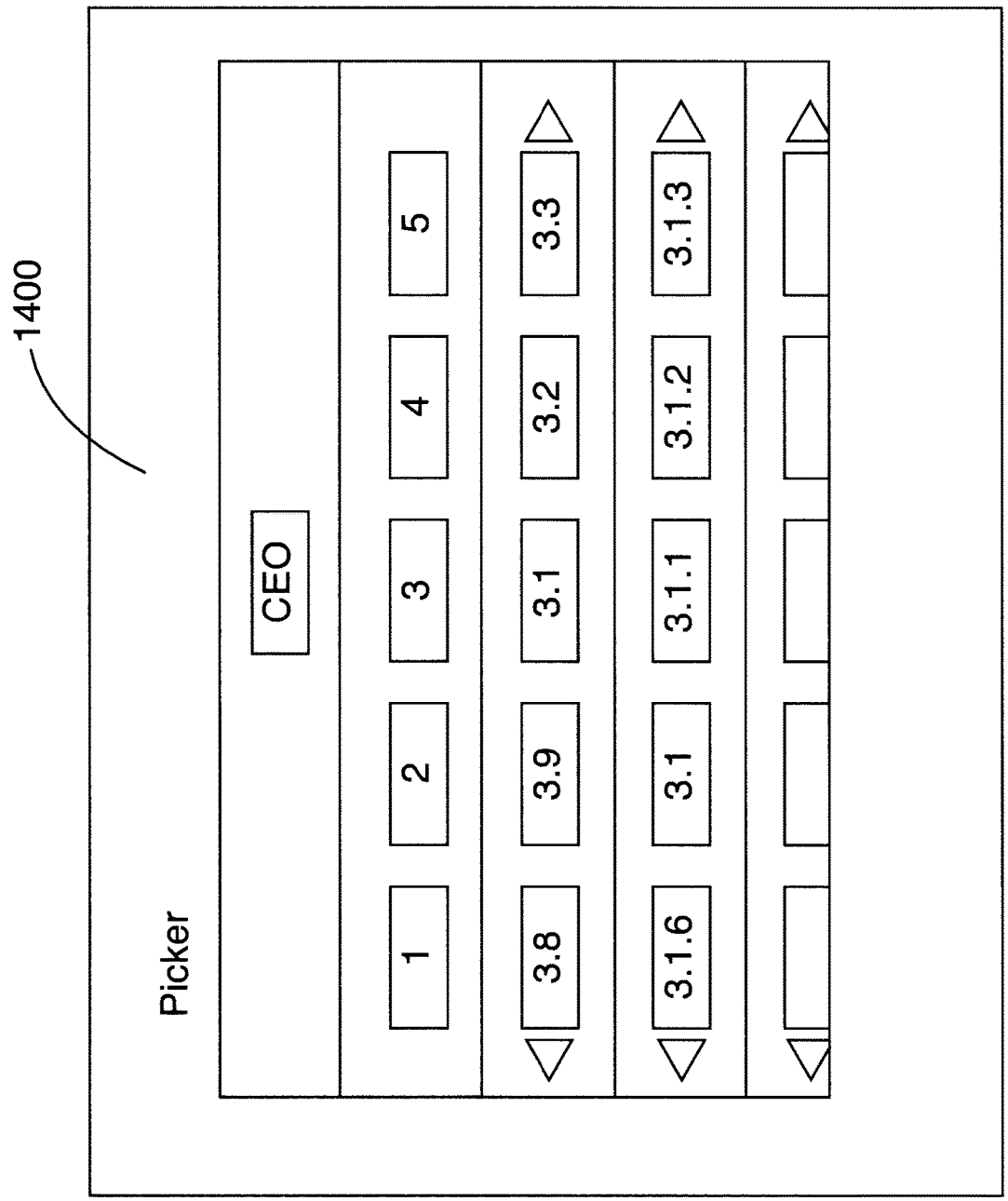
FIG. 14 is a screen capture illustrating alternate navigational aid tools in accordance with an embodiment of the invention.

FIG. 14 is a screen capture illustrating an alternate navigational aid tools 1400 in accordance with an embodiment of the invention. The navigational aid tools 1400 allow for traversing organizational hierarchies wherein individuals at different levels are decoupled so that each level may be navigated independently of the levels above and below it.

Figure 15:
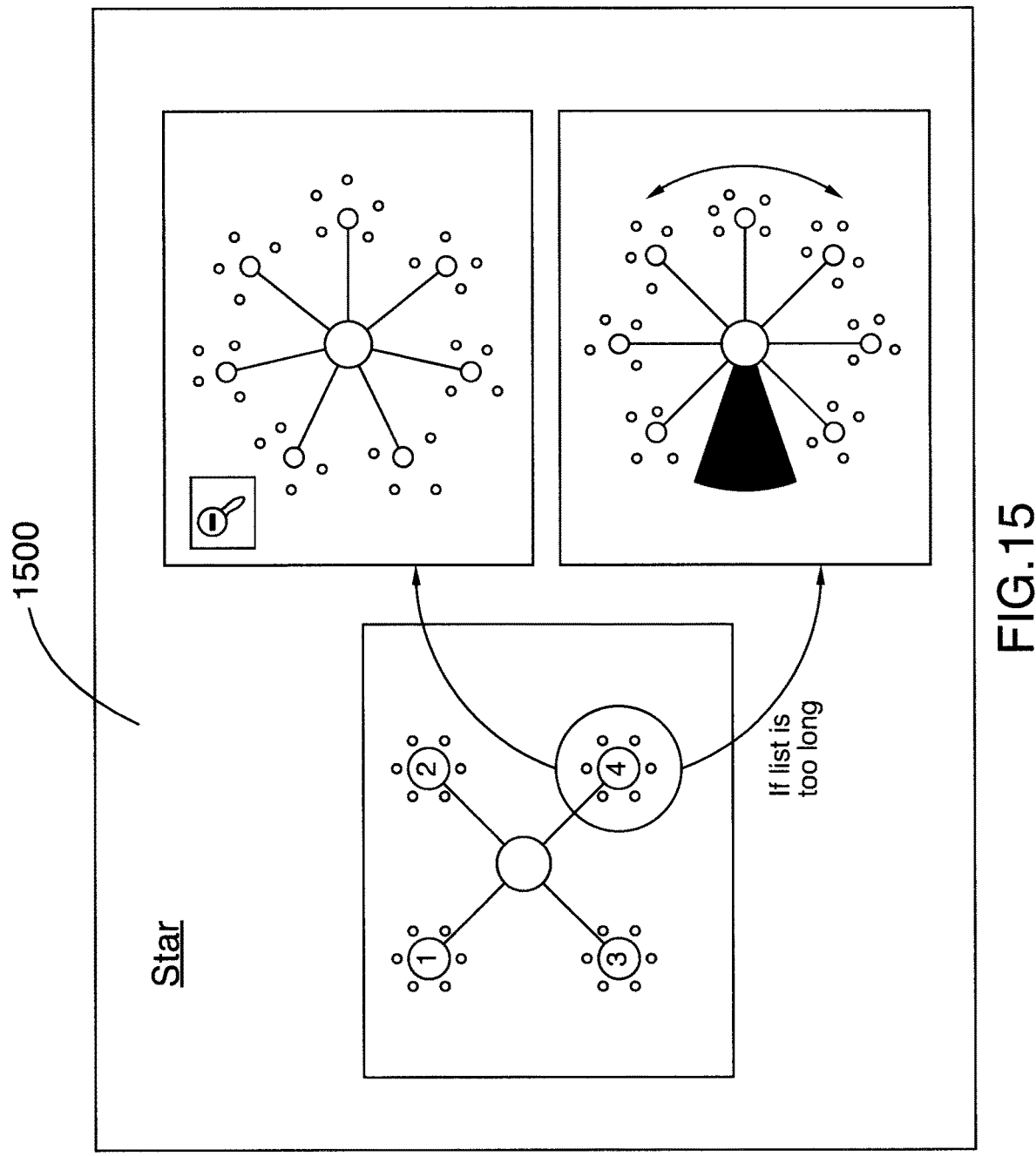
FIG. 15 is a screen capture illustrating a star or hub and spokes organizational chart presentation in accordance with an embodiment of the invention.

FIG. 15 is a screen capture illustrating a star or hub and spokes organizational chart presentation 1500 in accordance with an embodiment of the invention. In this organizational chart (or structure) 1500, a "star" or "hub and spokes" architecture is used for creating and displaying organizational hierarchies. This chart 1500 is a decision tree type chart.

Figure 16:
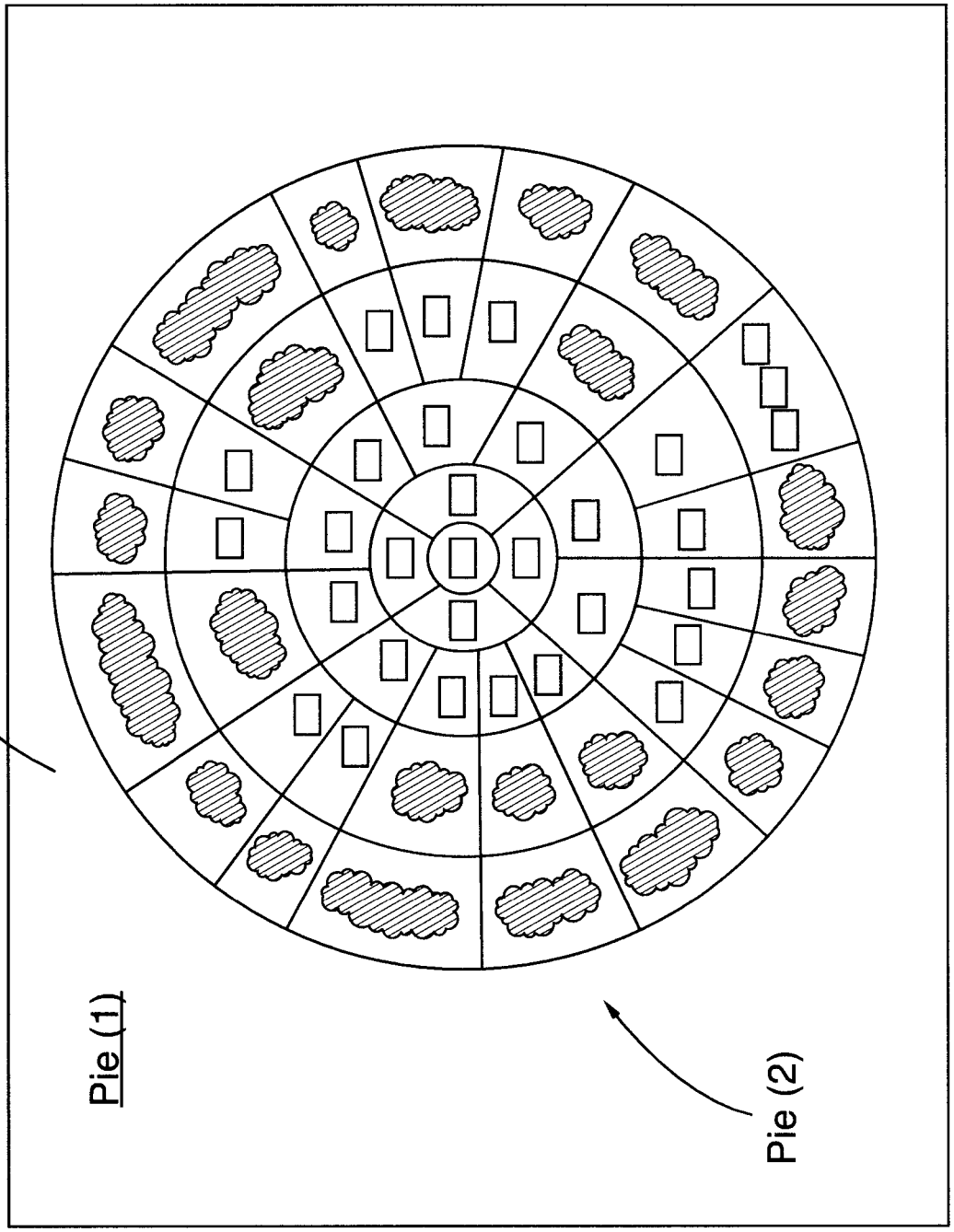
FIG. 16 is a screen capture illustrating a pie organizational chart presentation in accordance with an embodiment of the invention.

FIG. 16 is a screen capture illustrating a pie organizational chart presentation 1600 in accordance with an embodiment of the invention. In this organization chart (or structure) 1600, a "pie" metaphor is used for creating and displaying organizational hierarchies. This chart 1600 is a decision tree type chart.

Figure 17:
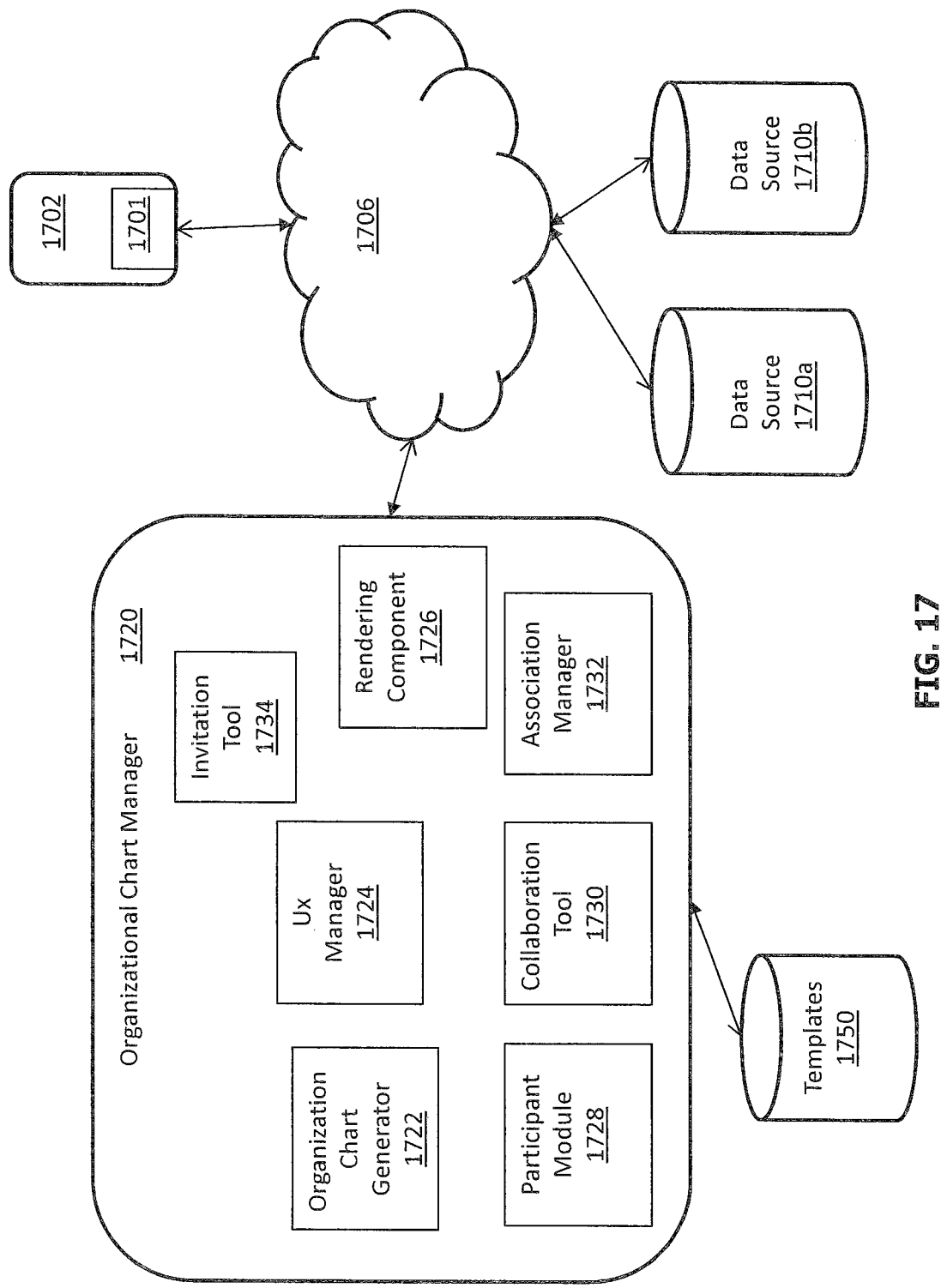
FIG. 17 is a block diagram illustrating an organizational chart manager module in accordance with an embodiment of the invention.

FIG. 17 is a block diagram illustrating an organizational chart manager module 1720, 331 in accordance with an embodiment of the invention. FIG. 17 illustrates an embodiment of the invention for providing organizational chart functionality to participants and administrators. Users may access the organizational chart manager 1720 according to one embodiment by using a client application 331, 1701 on a computing device 300 such as a smartphone 1702. The computing device 300, 1702 may be wired or wirelessly in communication with the manager 1720 over a network 351, 1706 such as the Internet. The smartphone 1702 may be configured similarly to the data processing system 300 and, as mentioned above, may be considered to be a data processing system 300.

The organizational chart manager 1720 includes a variety of components 321 or modules 331 including a user interface module 1724, 380 for interacting with a user of the manager 1720 via one or more input devices 310. The user interface module 1724 may present a variety of user interface screens (e.g., 500, 600, 700, 800, 900, 1000) in which to interact with users of the organizational chart manager 1720, examples of which are shown in FIGS. 5-16 and 20-21.

The manager 1720 includes an organizational chart generator 1722 for creating electronic organizational charts (e.g., 1100, 1200, 1500, 1600) that represent real world and/or virtual organizations. The organizational chart generator 1722 may access one or more data sources 1710, 332 to create an electronic organizational chart (e.g., 1100). An invitation tool 1734 may be provided for allowing a user to invite individuals or organizations to become part of the user's online organization. The invitation tool 1734 may intelligently determine candidate invitees by accessing a user's email, phone address book, social media sites (e.g., the user's "friends"), and so forth.

A rendering component 1726 is provided for creating a visual/audio presentation of an organizational chart 1100 on an output device such as a touchscreen or computer monitor 340. The rendering component 1726 may create dynamic organizational presentations 1100 to view the changes to an organization over a period of type or of a certain character.

The organizational chart manager 1720 includes a participant module 1728 for creating user profiles, initiating relationships (e.g., via the invitation tool 1734), uploading files associated with the user, setting security levels, and so forth. The participant module 1728 interacts with an association manager 1732 configured to manage relationships between participants and/or organizations.

According to one embodiment, a collaboration tool 1730 is provided for facilitating the collaboration between participants. The collaboration tool 1730 may support real-time meetings (e.g., video conference calls), instant messaging, collaborative creation and editing of documents (e.g., Google Docs™), project management, bug reporting, and so forth.

According to one embodiment, to initiate the creation of an organizational chart 1100, a user provides information about the organization to be modeled (i.e., the organization for which the electronic organizational chart 1100 is to be created) to the Ux manager 1724 which provides the information to the generator 1722. The organization information provided by the user may be any information that is relevant to the organization to be modeled, such as the organization's name, address, key employee (e.g., CEO), website address, social media pages, and so forth. According to one embodiment, the user may specify the type of information provided, for example, by providing the information in text fields that relate to a type of information. For example, one field may correspond to each of the types of information such as website address, organization name, key employees, etc.

According to one embodiment, the user may input the type of the organization to be modeled using an organizational type selector on a given user interface screen. If the type of the organization is not provided, an organizational type determiner 1814 intelligently determines the type of the organization based on the structure and information in the data source.

Figure 18:
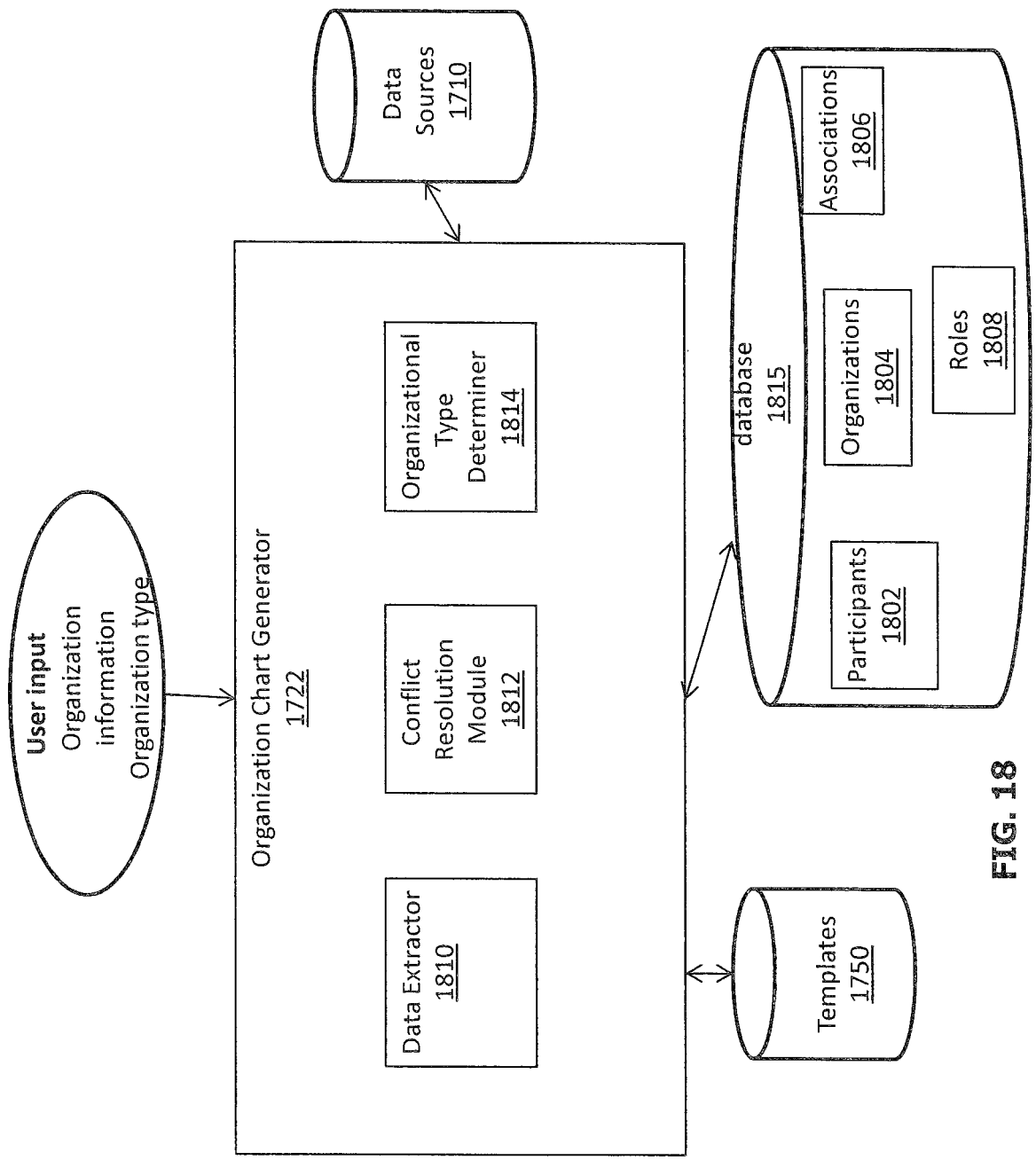
FIG. 18 is a block diagram illustrating the organizational chart generator module of FIG. 17 in accordance with an embodiment of the invention.

FIG. 18 is a block diagram illustrating the organizational chart generator module 1722, 331 of FIG. 17 in accordance with an embodiment of the invention. Once organizational information has been provided, a user of the manager 1720 may initiate the creation of an electronic organizational chart 1100 by interacting with the user interface 380 (e.g., by clicking or touching a "Create Chart" button). The user interface manager 1724 receives the create input instruction and instructs the organizational chart generator 1722 to create the electronic organizational chart 1100. According to one embodiment, the organizational chart generator 1722 may include a data extractor 1810 configured to receive the organizational information provided by the user and to identify one or more data sources 1710, 1710*a*, 1710*b*, 332 that may contain additional information. For example, a user may provide the website of a company for which the user wishes to create an electronic organizational chart. The user may initiate the creation of the chart by providing an input to the user interface 380 which instructs the organizational chart generator 1722 to create the organizational chart 1100. The data extractor 1810 accesses the company's website and extracts relevant information from the website such as company particulars (e.g., addresses, management, stock and financial information in the case of public companies, business units, and the like). The data extractor 1810 may use the extracted information to access additional data sources 1710 that may provide additional information about the organization to be modeled.

According to one embodiment, the data extractor 1810 accesses one or more social media websites such as Facebook™ and Linkedin™ to extract information related to the organization, such as for example, employees and their roles, employee history, changes to the organization over time, employee relationships (e.g., teams, leadership structure), relationships between the organization and third parties (e.g., legal and accounting advisers, suppliers, distributers, joint venture partners, etc.). The data extractor 1810 provides relevant data from the one or more data sources 1710 to the organizational chart generator 1722 for creating the electronic organizational chart 1100.

According to one embodiment, the organizational chart generator 1722 includes a conflict resolution module 1812 to resolve conflicts relating to information used to create and/or edit a particular electronic organizational chart 1100. After the data extractor 1810 has extracted relevant organizational information from the one or more data sources 1710, the chart generator 1722 may determine that some information may contradict other information. For example, in a situation in which a user provides the website address of the organization to be modeled, the data extractor 1810 may extract executive information like "John Smith" is the senior "Vice President of Business Development". The data extractor 1810 may reference additional data sources 1710 such as a social media site for professionals and determine that "John Smith" is the "Chief Operations Officer" of the organization. In constructing the electronic organizational chart 1100, the chart generator 1722 may determine the identity and roles 1808 of participants 1802, and the associations 1806 between participants 1802 in the organization 1804. This information may be stored in a database 1815, 332. If any of the information contradicts other information (e.g. the roles and/or associations are different across multiple data sources) the chart generator 1722 may ask the user to resolve the contradiction by entering new information and/or by selecting the information that the user believes to be correct.

According to one embodiment, the chart generator 1722 may create a conflict resolution screen (rendered by the rendering component 1726 and displayed on an output device 340) that identifies the conflicts that were found and prompts the user to resolve the conflicts. According to one embodiment, a user may choose to resolve the conflicts immediately or revisit the conflict resolution screen at a later date. If some conflicts are not resolved by the user, the visual representation of the organizational chart 1100 rendered by the rendering component and displayed on an output device 340 may identify that certain conflicts exist. For example, according to one embodiment, the visual organizational chart 1100 displayed on the output device 340 may highlight individuals and associations that are determined to have conflicts using colors, icons, visual effects, etc. A user may click on any of the highlighted entities which may prompt the user interface module 380, 331 to display a profile screen representing the participant and/or association. The profile page of entities that have unresolved conflicts shows a user that a conflict exists and prompts the user to resolve the conflict.

According to one embodiment, the organizational chart manager 1720 includes a participant module 1728 for managing participant information in an organization (e.g., employees) and the associations between participants and organizations as well as sub-organizations within an organization such as teams and business units. It will be appreciated that a participant may have different associations with multiple organizations simultaneously all of which may be viewed, edited, created, deleted or otherwise interacted with via a participant profile screen. For example, an individual may be an employee of one company, a member of a business team at the same company, a contractor with another company, a volunteer at a charitable organization, and a team member of a sports team. The individual's profile and relationship with each organization may be managed from a participant profile screen. A variety of information and digital files may be associated with a participant profile by the participant and/or an administrator. For example, pictures, a resume, audio and video files, summary of activities and interests, history, blog postings, etc., may be added by authorized individuals. The participant information may be publicly available to all users of the organizational chart manager 1720, or may be restricted to certain individuals with appropriate security levels depending desire of the user and/or administrator.

An entity may simultaneously be a participant and an organization. For example, a sports team may be an organization with players and staff, as well as a participant in a league. Likewise, a company may be an organization with employees and contractors, as well as being a joint venture partner in a joint venture "organization" with other companies.

Figure 20:
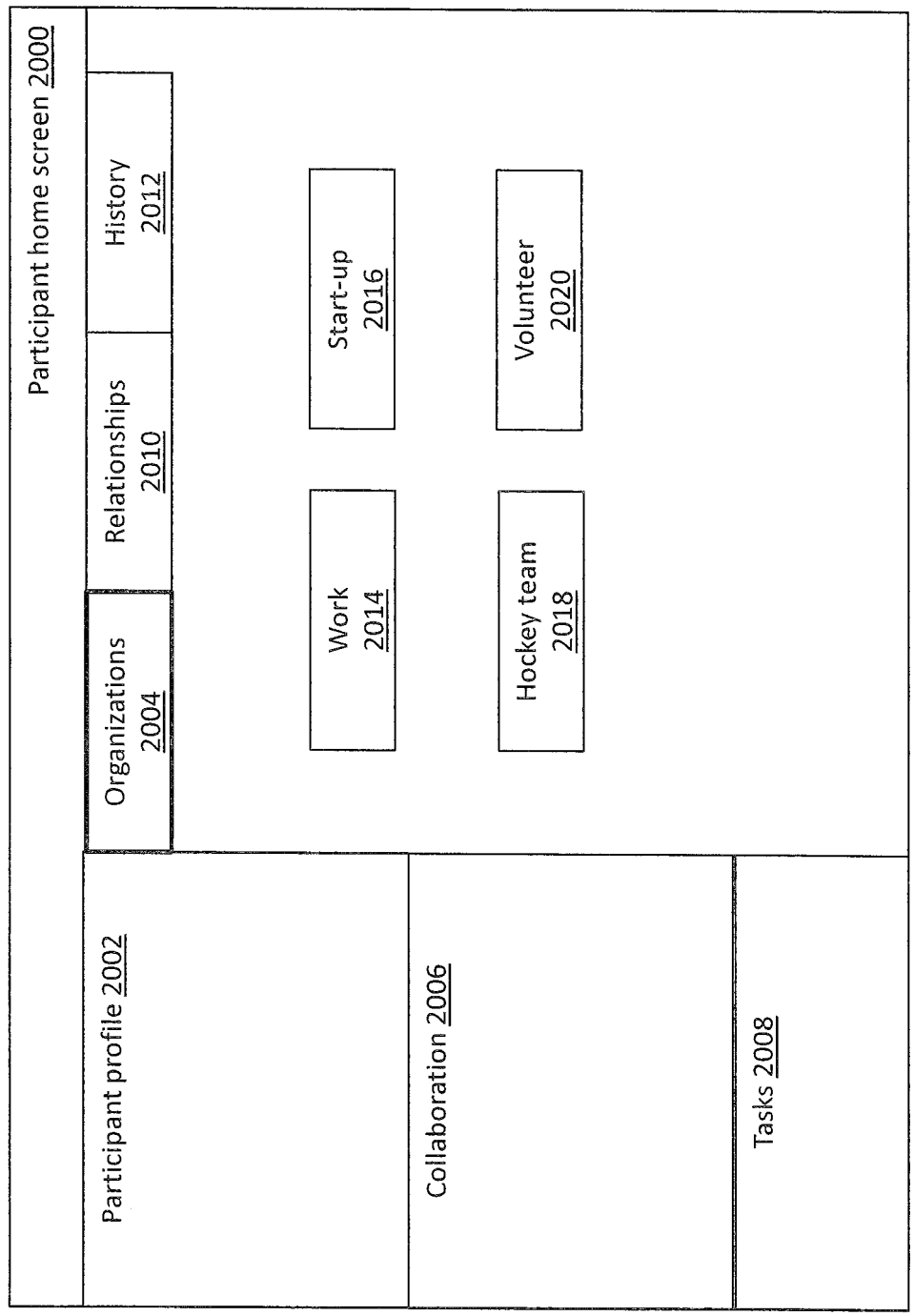
FIG. 20 is a screen capture illustrating an exemplary user interface screen for interacting with electronic organizational charts, in accordance with an embodiment of the invention.

FIG. 20 is a screen capture illustrating an exemplary user interface screen 2000 for interacting with electronic organizational charts 1100, in accordance with an embodiment of the invention. In FIG. 20, an exemplary user interface screen 2000 is shown that may provided in various embodiments. The participant home screen 2000 includes a participant profile 2002 for viewing important details about a participant (e.g., name, role, length of time at an organization, catch phrase, etc.), a collaboration area 2006 for communicating with other participants, a tasks area 2008 for viewing tasks that the user wishes to complete or has been assigned, as well as multiple organizations 2014 (work), 2016 (start-up), 2018 (hockey team), 2020 (volunteer) of which the participant is a part.

A user may click on any of the organizations (e.g., work 2014) to drill down on the details, participants, relationships, history, etc. of the selected organization 2014. This information is available through an organizations tab 2004 of the screen 2000.

The screen 2000 may include a relationships tab 2010 for viewing a relationship screen showing the relationships between the user and other participants. According to one embodiment, the user may invite participants to join his/her organization by using an invitation tool on the participant's screen. In addition, the screen 2000 may include a history tab 2012 for viewing the organization chart 1100 as it changes over time, for example.

Figure 21:
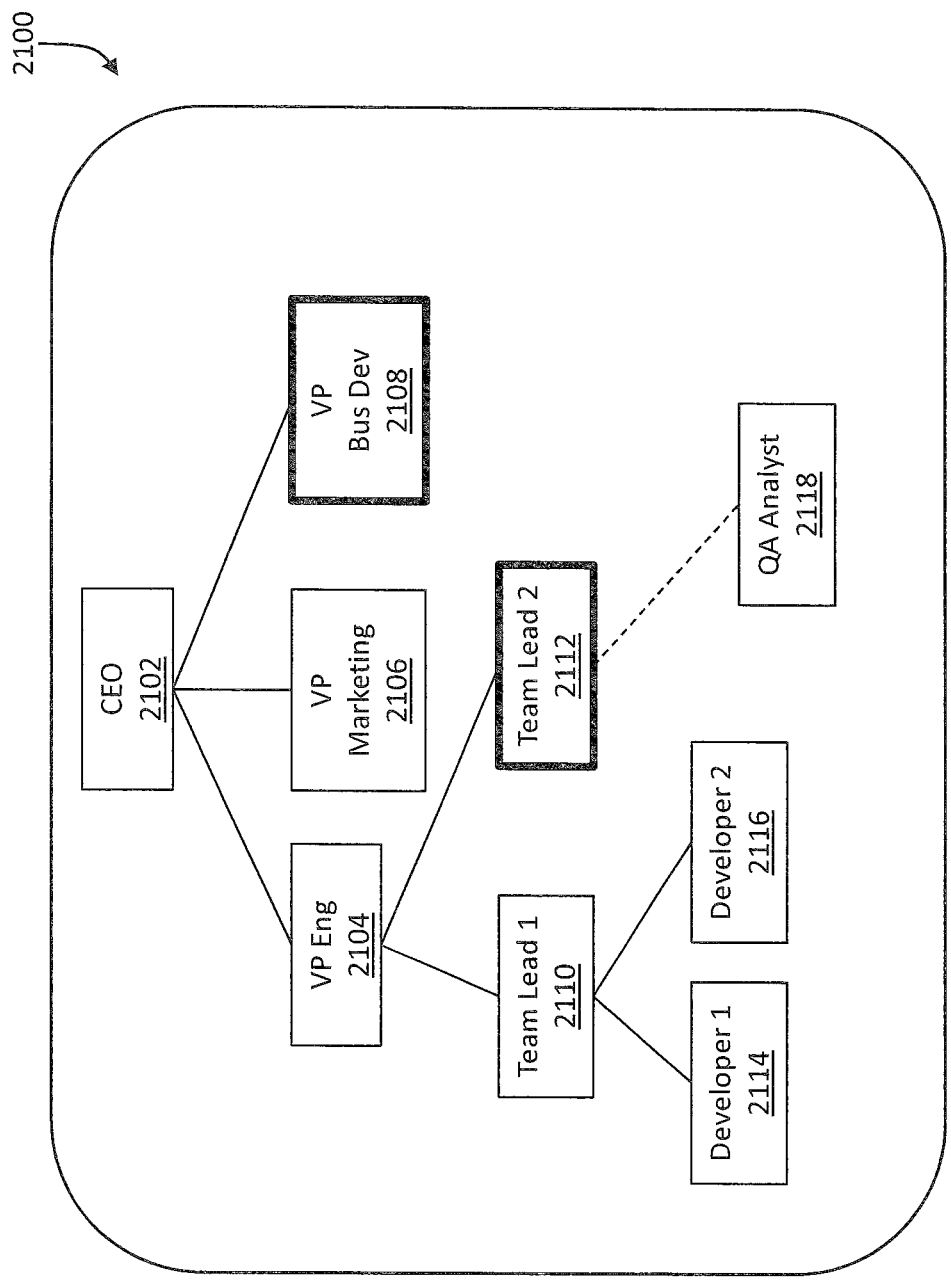
FIG. 21 is a screen capture illustrating a focus view presentation in which participants matching specified criteria are highlighted for viewing and interaction by a user, in accordance with an embodiment of the invention.

FIG. 21 is a screen capture illustrating a focus view presentation 2100 in which participants matching specified criteria are highlighted for viewing and interaction by a user, in accordance with an embodiment of the invention. In FIG. 21, an exemplary presentation 2100 is shown for highlighting participants within an organization based on certain input information provided by a user. According to one embodiment, a user may provide an address of a location, a picture of a building, GPS coordinates, and the like to the organizational chart manager 1720 which identifies and displays participants that are within a certain distance of the location. For example, a user is at a meeting in San Francisco and uses his/her client organizational chart application 108 to determine which other participants may be in the same region. The user may wish to go out for dinner, have a meeting or otherwise engage with participants nearby. The user may instruct the client application 1701 to show nearby participants and the manager 1720 will determine which participants are nearby (e.g., by accessing the GPS coordinates of their device 1702) and highlight the participants to the user.

In FIG. 21, an organizational chart presentation 2100 is shown that highlights a first participant 2108 (i.e., VP Bus Dev) and a second participant 2112 (i.e., Team Lead 2) that are within a predetermined distance of the user. The user may then click on one or both participants 2108, 2112 to communicate with them, collaborate, book a meeting, and so forth. The remaining participants 2102, 2104, 2106, 2110, 2114, 2116, 2118 are not highlighted.

Figure 22:
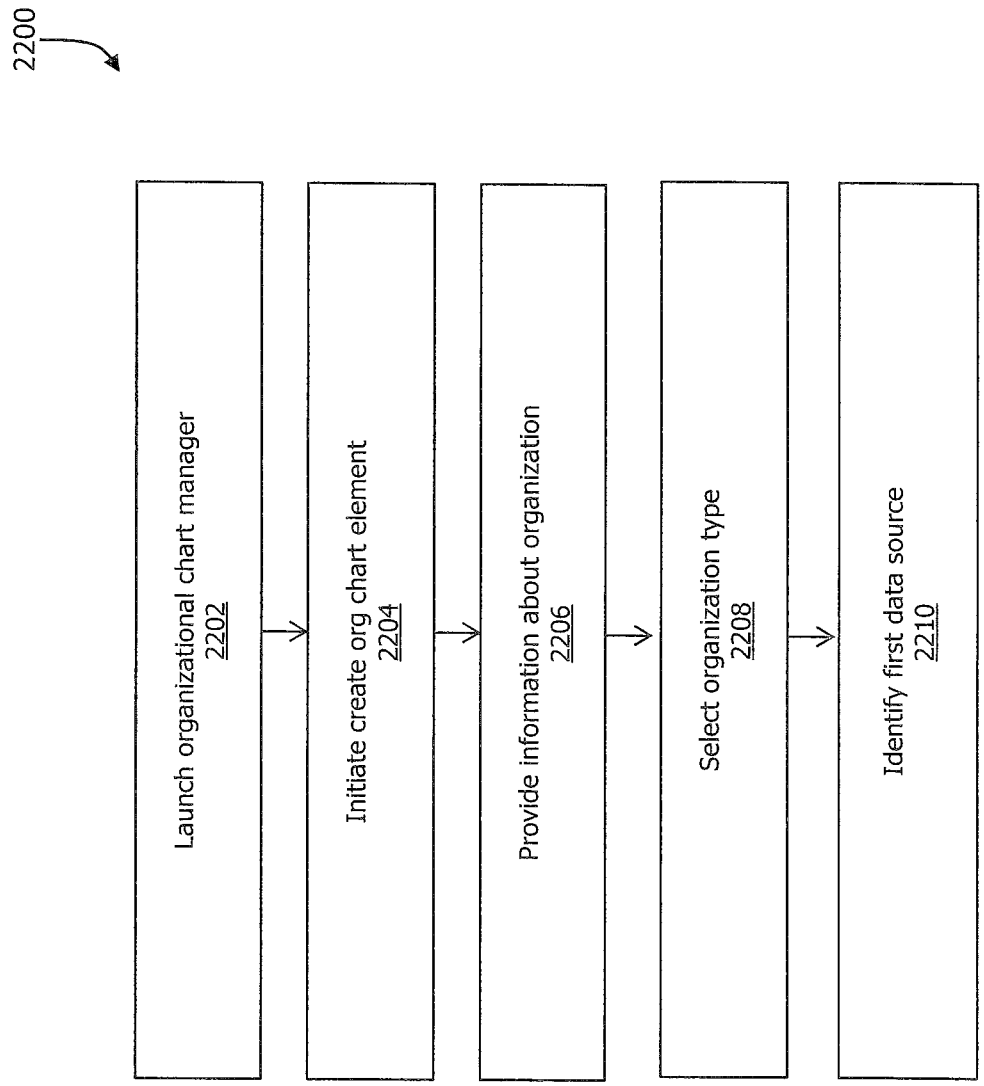
FIG. 22 is a flow chart illustrating exemplary operations (or methods) for creating an electronic organizational chart, in accordance with an embodiment of the invention.
Figure 23:
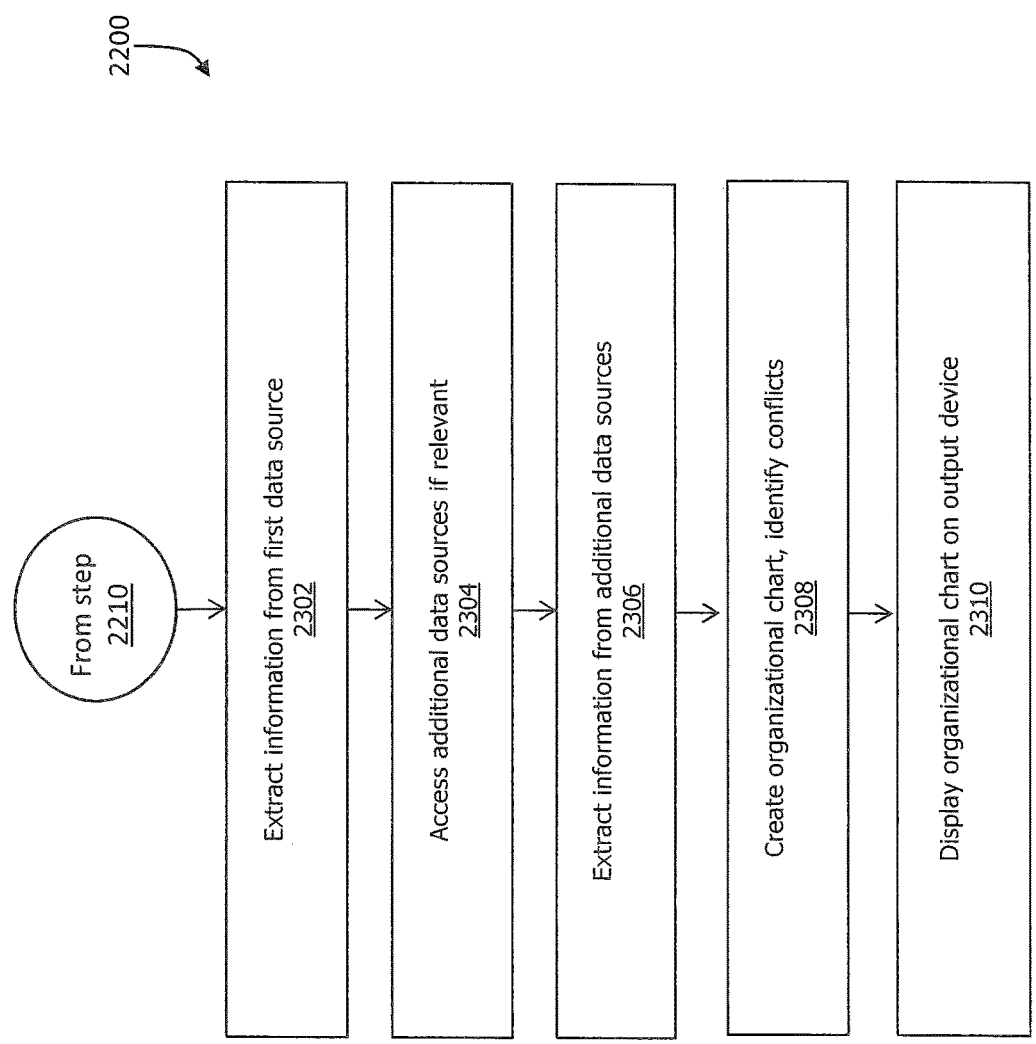
FIG. 23 is a continuation of the flow chart of FIG. 22.

FIG. 22 is a flow chart illustrating exemplary operations (or methods) 2200 for creating an electronic organizational chart 1100, in accordance with an embodiment of the invention. And, FIG. 23 is a continuation of the flow chart of FIG. 22. With reference to FIGS. 22 and 23, a description of exemplary operations (methods) 2200 for creating an electronic organizational chart 1100 representing a real-world or virtual organization having participants will now be provided. At step 2202, a user such as a system administrator or a participant launches the organizational chart manager 1720 on a computing device 300 such as is shown in FIG. 19. The organizational chart manager 1720 includes a client application for interaction with the user (such as an app 1701 on a smartphone 1702) as well as one or more server components in a cloud-based environment for processing requests made by the user and providing output to the computing device 300.

At step 2204, the user initiates a create organizational chart action by providing an appropriate input command such as by clicking on a "create chart" button, voicing a natural language command such as "create a new organizational chart", and/or inputting other commands as will be appreciated by one of skill in the art. The organizational chart manager 1720 launches an information screen so that the user may provide information about the organization to be modeled at step 2206. Example information includes the name of the organization, the website of the organization, key employee or participants, and the like. The information screen may include labeled text fields corresponding to certain types of information that may be provided by the user.

At step 2208, the type of the organization may be selected by the user by interacting with an organizational type selector, such as a drop-down list. Typical types of organizations include companies, partnerships, teams, charities, churches, community groups, and so forth. In various embodiments, the type of the organization need not be provided by the user, but rather the organizational manager 1720 determines the type of the organization intelligently based on information extracted from one or more data sources 1710, 332.

At step 2210, a first data source 1710a is identified and information is extracted by an extractor component 1810 of the organizational chart manager 1720. For example, a user may provide a website address for a company to be modeled. The extractor component 1810 may access the website at step 2302 to create a data structure representing the organization (i.e., an organizational chart). The extractor 1810 may identify relevant information from the data source 1710a such as key employees, business units, offices, and so forth to create the organizational chart 1100.

At steps 2304 and 2306, additional data sources 1710b may be identified and information extracted therefrom to continue to generate the organizational chart 1100. The additional data sources 1710b may be provided by the user and/or intelligently identified by the organizational chart manager 1720. For example, a user may provide a website address of the organization, which is accessed and examined by the extractor 1810. The extractor 1810 may determine additional information (such as key executives) and use this information to access one or more social media sites having pages associated with one or more executives. The extractor 1810 may further examine relationships that the one or more executives have with other people (or businesses) to identify other employees of the organization and the relationships between employees. In this way, the extractor 1810 may fill in the organizational structure by identifying, accessing, and extracting information from a large number of data sources 1710, 1710a, 1710b, 332.

At step 2308, the organizational chart manager 1720 creates a preliminary version of the organizational chart 1100 and a visual representation (i.e., presentation) of the organizational chart 1100 for display to a user on an output device 340 of the computing device 300 (step 2310). According to one embodiment, the organization chart manager 1720 performs conflict checking operations to identify conflicting information from the data sources 1710, 1710a, 1710b, 332 and for flagging such conflicts to the user. The conflicts may be flagged for the user by generating and displaying a conflict screen listing the conflicts found and asking the user to resolve the conflicts. The user may choose to resolve the conflicts immediately or revisit the conflicts for resolution at a later date. According to one embodiment, the visual representation (i.e., presentation) of the organizational chart 1100 highlights potential conflicts (e.g., by graying out certain participants, roles, and/or associations) so that a user doesn't forget that certain conflicts remain unresolved.

Figure 24:
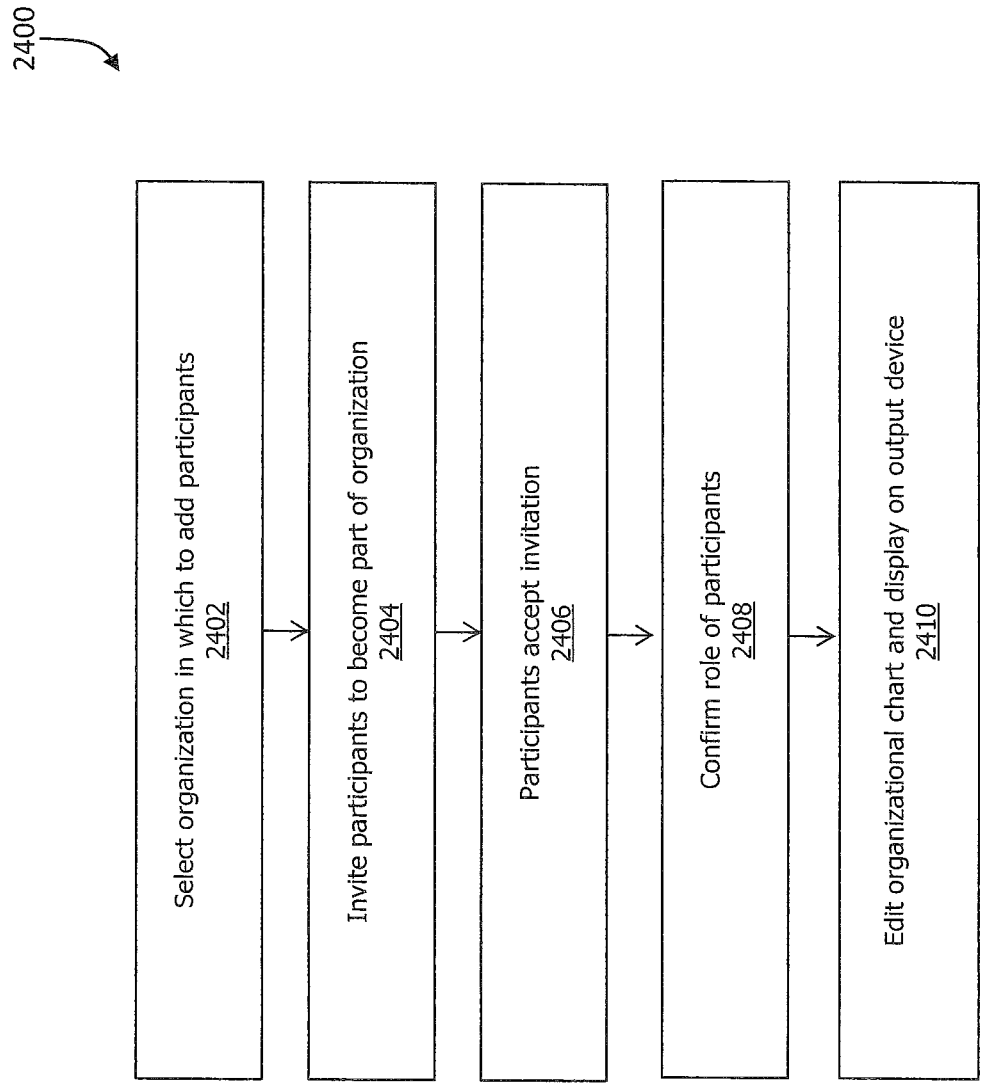
FIG. 24 is a flow chart illustrating exemplary operations (or methods) for adding one or more participants to an organization, in accordance with an embodiment of the invention.

FIG. 24 is a flow chart illustrating exemplary operations (or methods) 2400 for adding one or more participants to an organization, in accordance with an embodiment of the invention. Referring to FIG. 24, exemplary operations (methods) for adding participants to an organization which may be implemented in one embodiment will now be described. At step 2402, a user selects the particular organization for which to add one or more participants. As described herein, the user may have relationships simultaneously with multiple organizations of different types, all of which may be interacted with through a user interface provided by the organizational chart manager 1720. At step 2404, the user may invite one or more individuals (or other organizations) to become participants in the organization selected at step 2402. The invitees may be manually entered by the user on an invitation screen or may be intelligently populated by the organizational chart manager 1720 for selection by the user. According to one embodiment, the organizational chart manager 1720 interfaces with other contact data sources to create an invitee list such as social media sites, email accounts, contact management software, phone address books, and so forth.

Once the user has decided which contacts to send invitations, the user may initiate a send invitation action via the user interface (step 2404). The user may provide additional information in relation to each invitee such as the nature of the relationship, the length of the relationship, location, and the like. The organizational chart manager 1720 may send such information to the invitees for confirmation. For example, an invitee may receive an email such as the following: "Ed Smith would like you to join his electronic organization. Ed says you have been working together on a start-up for 6 months". The invitee may accept the invitation by clicking on a confirmation link within the email, which may direct the invitee to a website interface for the organizational chart manager 1720 so the invitee may create their own account (step 2406). According to one embodiment, the user invites various individuals without providing additional information. If a particular invitee accepts the invitation, the invitee is prompted to create an account on a website and to provide additional information about the nature of the invitee's relationship with the user and/or the organization (step 2408).

At step 2410, the organizational chart manager updates the organizational chart 1100 accordingly as new participants accept invitations and additional information is provided by the user and/or the participants. The organizational chart manager 1720 may store each change made to an organizational chart over time so that dynamic visual representations of an organization's history, a participant's history across organizations, and other changes may be rendered and displayed on an output device 340.

According to one embodiment, entity recognition is provided. The system 300 may include a module 331 for receiving an image (e.g., provided by a smartphone 1702 or augmented reality device like glasses, etc.) and through image recognition may determine the identity of an individual and may then look up that individual's profile with pertinent information about that individual in the context of a given situation. Other inputs may be provided such as pictures of buildings, audio files of voices, etc., to quickly view a participant's profile.

According to one embodiment, compare/rewind organizational change functionality is provided. The system 300 may include a module 331 for displaying what has happened to an organizational chart during a defined time period. For example, a CEO may gone on a trip for two weeks and when the CEO returns the CEO may log into the system and query, "How has the organization changed since March 1 or since I last logged in?" The system 300 may then highlight all the changes to the relevant organizational chart 1100. In addition, and if the user chooses, the changes to the organization chart 1100 may be run in sequence with time stamps to show a "fast forward" view of the changes that have occurred. The user may only wish to see certain types of changes (e.g., senior staff changes) or changes in a particular business unit or location. This may also be supported by the system 300.

According to one embodiment, a promotion/decision management module 331 is provided. In the system 300, the user may click an icon or otherwise provide input that initiates a query such as: "What promotions or job moves have occurred since [a selected time] that I need to acknowledge?" The system 300 may then present the user with a list of job promotions, role changes, new employees, and badged accomplishments. The system 300 may then create a one click email for those items which may be sent to the person on the list congratulating them on their promotion. This may require that the user make some number of personal adds so that the email is not too obviously a form email. Furthermore, the system 300 may create and display a list of other sign-offs that are required by the user, for example, budget approvals, documents to sign, and the like that require the attention of the user. Such tasks may be summarized in a task section of the user's home screen in a prominent location.

According to one embodiment, near field identification is provided. Using proximity sensing technology, the system 300 may locate all the participants in a given organization within a predetermined distance (e.g., 20 meters) of user's location. This allows a user to see which participants are in a meeting or an event so that the user can dig into their profile. The system 300 may also integrate indoor mapping technology to tell a user who else is in a room or on a floor. The user may make notes in real-time regarding a particular participant which will be associated with the user's view of a particular participant. Such notes may be voice inputs so that a user can make digital recordings at an event so that information is captured immediately, associated with a particular participant and/or organization, and is retrievable at any time.

According to one embodiment, the system 300 includes a module 331 for location-based context services. A user may provide a location automatically via GPS, or enter a location, business unit, department, etc., to a client application. An organizational view may be provided on the output device for allowing the user to walk through dynamic organizational changes based on the input provided. For example, in the case of a location input, an organizational view may be provided showing employee movements, financial performance, analytics, etc., for further drilling. A user may enter more complex search criteria to evaluate performance and spot trends. For example, a CEO may wish to view all senior managers that have an employee attrition rate over a given amount.

According to one embodiment, an organizational view is provided which allows organizations to be embedded within other organizations, and progressive drill-down functionality is provided for focusing on particular organizations, business units, teams and participants. For example, a sports league organization may be represented as a tree structure with icons for each team which are also organizations. A user may choose to expand a given team to view the team members, track history and statistics, view dynamic visual changes to the team, and so forth. A user may further drill-down by clicking on individual team members to view his/her profile. According to one embodiment, a user may upload pictures, icons, videos, etc., that may be used to represent participants and/or organizations in one or more views.

According to one embodiment, the system 300 includes a module 331 for allowing users to create online organizational charts 1100. An organizational chart 1100 may be represented visually using geometric shapes, icons, line types, colors, effects and other visual features to represent participants in an organization, the roles of participants, the relationships between participants, a participant's place in an organizational hierarchy, etc., on a computing device 300. Organizational charts 1100 may be created through the selection and manipulation of a set of pre-defined templates 1750 representing typical organizational structures (e.g., corporate, partnership, charity, church group, sports team, and similar structure types). The organization type may be selected by the user creating the organizational chart 1100 or may be intelligently determined by an organizational chart manager 1720 by accessing one or more data sources having information relating to the organization.

According to one embodiment, the system 300 includes a module 331 for enabling an individual to create, claim and maintain their own profile within a software based organizational hierarchy system across multiple online organizational charts 1100 including establishing thresholds and permissions for selective reuse or integration of information from their profile in different organizational structures at the same time.

According to one embodiment, the system 300 includes a module 331 for enabling an individual to populate an organizational chart 1100 in an online social networking environment, including creating, editing and managing a user profile, and connecting the user profile with multiple user profiles within the same organization. A user may invite people (and other organizations) to become participants within an organization whereby the participants become users of the organizational chart application 108 and may manage their own profile and relationships. For a given organization, certain participants may be given administrator status and the capability of setting security access settings of other participants in the organization.

According to one embodiment, the system 300 includes a module 331 for uploading and storing to an organizational chart 1100 created in the system 300, through the medium of one or more mobile computing devices 1702 connected to a network 351, relevant information about one or more members of the organization included in such organizational chart 1100, including digital media assets such as a voice record capable of play, photographic images and video material, and text. Furthermore, participants may upload and organize documents related to an organization such as scrum meeting minutes, project plans, presentations, etc., that may be collaboratively worked on by participants given editing authority for such files.

According to one embodiment, the system 300 includes a module 331 for enabling a user to create and manage for any individual a multitude of relationships to a diverse group of organizational charts 1100 in the same on-line environment. The system 300 may provide access to and manipulation of one or more organizational charts 1100 by both direct user methods and via application programming interfaces to other applications and systems. As such, organizational charts 1100 may be automatically updated based on business rules, machine learning, etc., upon the happening of certain events. For example, if an administrator deletes an email account for an employee that was terminated, the system 300 may recognize this event and update the organizational chart 1100 accordingly by changing the status of the participant that was terminated.

According to one embodiment, the system 300 includes a module 331 for enabling individuals within an organization to engage in communication with multiple participants within the environment via the mechanism of the organizational chart 1100 using remote Internet communications technologies such as VOIP. The invention may provide one or more collaboration tools (such as a meeting manager, project manager and task manager) for allowing selected users to collaborate on projects in real-time.

According to one embodiment, a module 331 is provided that allows individuals within an organization to provide anonymous assessment of colleagues that reflects user rating systems defined by the organization and enables the sharing of this feedback following crowd sourcing principles for gathering and displaying opinions and feedback.

According to one embodiment, a history module 331 is provided for enabling the display of corporate organizational changes visually over time. A user may enter a specific time range, view changes over the entire history of an organization, focus on certain departments, projects, employees or categories of employees, and so forth.

According to one embodiment, a module 331 is provided that enables the tracking of career paths and influence networks across multiple organizations of individuals through time based analysis of changes in their network connections. A user may create a visual resume which may be shared with other participants or sent to third-parties using communication tools provided by the system 300 (e.g., email).

According to one embodiment, modules 331 are provided for: enabling the delivery of targeted messages and communications to specific users within an online complex organizational hierarchy; enabling an individual member of a social network to provide access to their profile within one or more organizational networks they belong to in exchange for a payment of money or other consideration; enabling visual representation of complex organizational structures through the use of zoom, "fly through", and other representations at a geographical (e.g., global, regional, local) and/or functional (e.g., departmental, reporting group) level; creating a representation of a corporate organization on-line; enabling individuals to upload their personally identifiable information including voice recordings, video images, documents, and other messages; enabling searching of a repository of organizational profiles, with controlled access for the search bots to specified content only; enabling individuals to store and manage their career development, mentoring, and expertise information; implementing a recommendation engine for matching mentoring opportunities, the recommendation engine may use the information that is associated with a given participant and further provided by the participant to intelligently determine candidates within and external to a given organization for mentoring and other collaboration activities; enabling dynamic integration with multiple directories and services, for example, a law firm and/or lawyer participants may manage their relationships and listings with external directors such as a State Bar, lawyer directories, social media sites, job posting sites, media coverage, and so forth; managing the corporate—individual information management flow, for example, by using the collaboration functionality provided according to one embodiment, a participant (such as a CEO) may send important communication to some or all of the employees, and a participant may require that all individuals receiving the communication read the entire communication or parts thereof (e.g., attached documents) as desired; permitting individuals to include more or less information within one or more profiles depending on the organization and/or individual requesting access to their profile information; enabling the automated updating of social networks and devices connected to the network to flag changes in an organizational hierarchy; providing analysis and reporting of changes in organizational structures and relationships, the changes may be reviewed in several ways including visual effects, speech output, using analytics, etc.; enabling a collection of users to establish a "truth" system for the accuracy of online information supplied to an organizational structure and permitting automated editing of the system on a fully automated basis, with weighting by votes or other user defined measures, the users may also vote, provide feedback, and/or make suggestions (anonymously in some cases) on certain corporate decisions, direction, strategic initiatives, etc.; enabling auto-load and auto-population of an organizational structure based on API calls to other social networks and/or user upload of user profile information from a directory system or service (e.g., MS Exchange, Lotus Notes, an xis, a csv file etc), a predefined template memory may be accessed to determine the type of a particular organization and fill in the organizational chart accordingly; allowing users to add additional templates and representing new types of organizations and edit existing templates; and, differentiating between closed system (modification by authorized members only) and open system (modification permitted by any user), for example, users may edit their own profiles but not the profiles of other participants.

Figure 26:
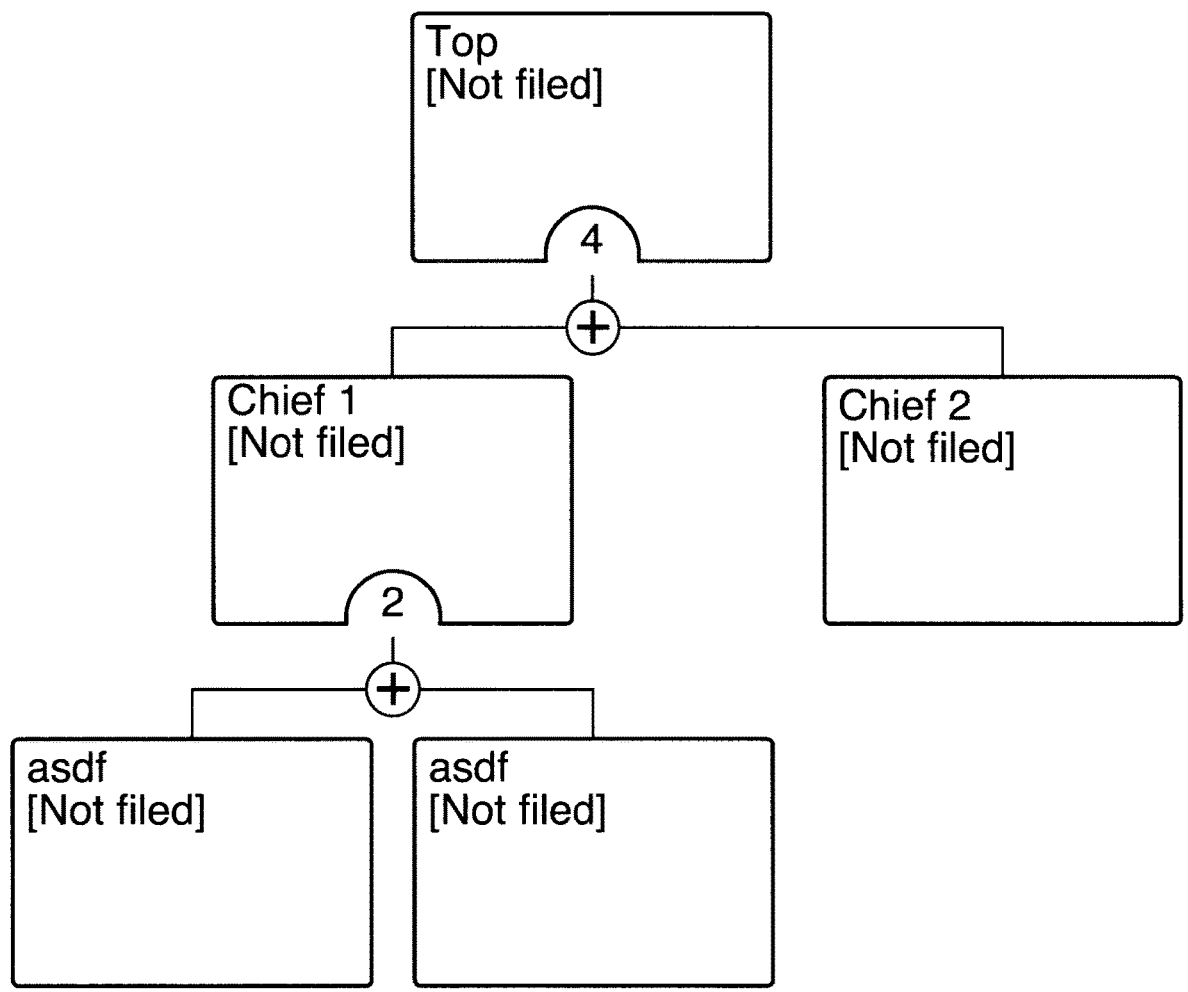
FIGS. 26 and 27 are screen captures illustrating organization chart rendering in accordance with an embodiment of the invention.
Figure 27:
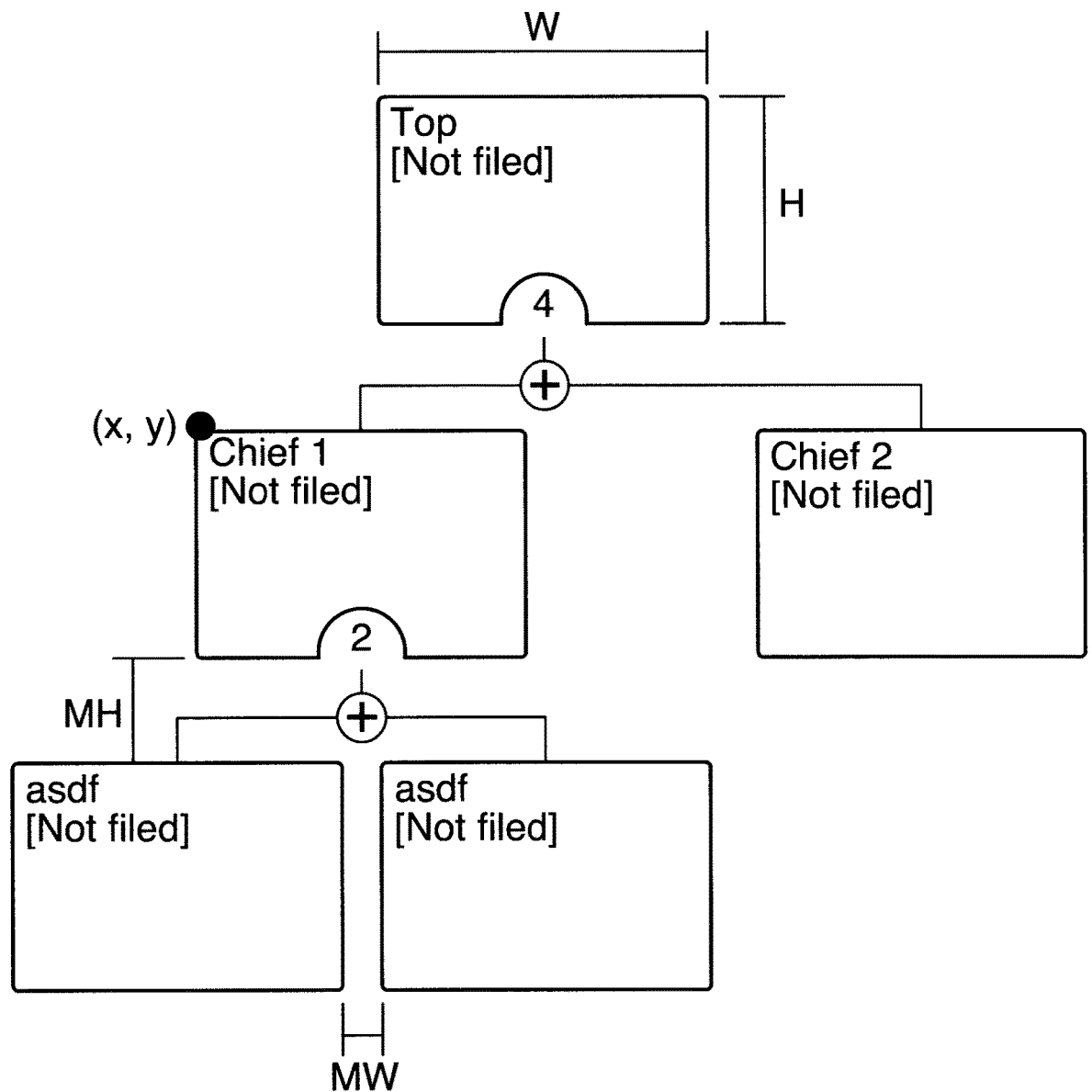

FIGS. 26 and 27 are screen captures illustrating organization chart rendering in accordance with an embodiment of the invention. An organization chart may be considered to be a form of tree structure, whose standard visual representation is an inverted tree. FIG. 26 shows an organizational chart where roles are represented by nodes in a tree. Each role has 0 or more child(ren), and 1 or more parent(s). The root does not have any parent of its own and takes top position in the chart. Roles that share the same parent-node are referred to as siblings. Each role is the root of the subtree immediately underneath it. According to one embodiment, an application module 331 is provided that focuses on the graphic conversion of a tree-like data structure into a standard inverted tree form that can be rendered on any display medium.

According to one embodiment, organizational chart elements may be positioned by cartesian coordinates using depth-first tree traversal. An organizational chart may be visually rendered on a larger canvas chart-area where each role is represented by a smaller role-area of consistent shape (e.g., rectangular, circular, etc) and positioned with a (x, y) point to represent the top-left corner of each role-area. Roles are connected by lines to represent the report structure of the organization, and can similarly be positioned by two points. This algorithm may be parametrized by a number of dimensions. A basic few of these are shown in FIG. 27. FIG. 27 shows a few basic parameters which have been simplified for the purpose of this description: H—height of a role-area; W—width of a role-area; MH—vertical separation between two role-areas; and, MW—minimum horizontal separation between two role-areas. The following is simplified pseudocode with a JavaScript™ flavor which demonstrates the algorithm to calculate the position coordinate (x, y) of each role-area relative to the top-left corner of the chart-area:

```
1.  function calculatePositions(role, start_x, start_y) {
2.    lower_width = 0;
3.    lower_height = 0;
4.    result = { };
5.    for (child in role.children) {
6.      r = calculatePositions(child, start_x + lower_width, start_y + H + MH);
7.      lower_width = lower_width + r["width"];
8.      lower_height = max(lower_height, r["height"]);
9.    }
10.   role["x"] = start_x + MW/2 + max((lower_widths − W)/2, 0);
11.   role["y"] = start_y;
12.   result["width"] = max(W + MW, lower_width);
13.   result["height"] = H + MH + lower_height;
14.   return result;
15. }
```

The above listing of pseudocode may be used to calculate the position of each role-area in an organizational chart 1100. The calling context executes calculatePositions(root, 0, 0). The (x, y) coordinates are encapsulated in role["x"] and role["y"] for each role in the tree.max returns the highest value parameter. The above listing demonstrates a recursive version of the algorithm. Iterative versions may similarly be used. The x-position of each role is calculated by centering the role relative to the subtree below it. lower_width is used to keep track of the starting x-position of each child-role. lower_height keeps track of the height of the subtree underneath each role.

Once the position of every role in the organizational chart is calculated, the horizontal and vertical reporting lines may be similarly calculated by calculating the horizontal centers of each role-area. This algorithm may be used to render organization charts on any display medium that provides means to draw elements by cartesian coordinates. A non-exhaustive list of such media include web pages, images, print, tablets, etc.

According to one embodiment, organizational chart elements may be positioned by using boundary wrappers. Many computer-based programmable media provide wrapper elements into which other elements can be dynamically inserted during program execution. Examples of such wrapper elements include: HTML tags like <div> and <li> for web page displays are one example of such wrapper elements, which can be dynamically manipulated using JavaScript™; layout elements for building Android™ mobile user interfaces; and, controls arrangement methods for building Windows™ user interfaces. Each role-area is created dynamically with a bottom margin, and is encapsulated in a bounding wrapper. The bounding wrapper resizes to accommodate its content, and centers the role-area bounded within.

Figure 28:
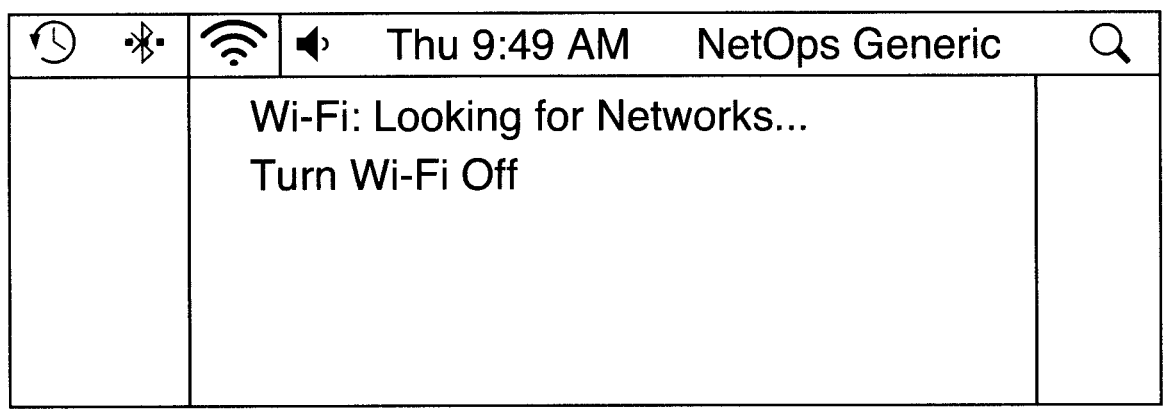
FIGS. 28, 29, and 30 are screen captures illustrating tools for quickly accessing dynamically managed contact lists in accordance with an embodiment of the invention; and, FIGS. 31 to 38 are screen captures and block diagrams illustrating a scrapper application module in accordance with an embodiment of the invention.
Figure 29:
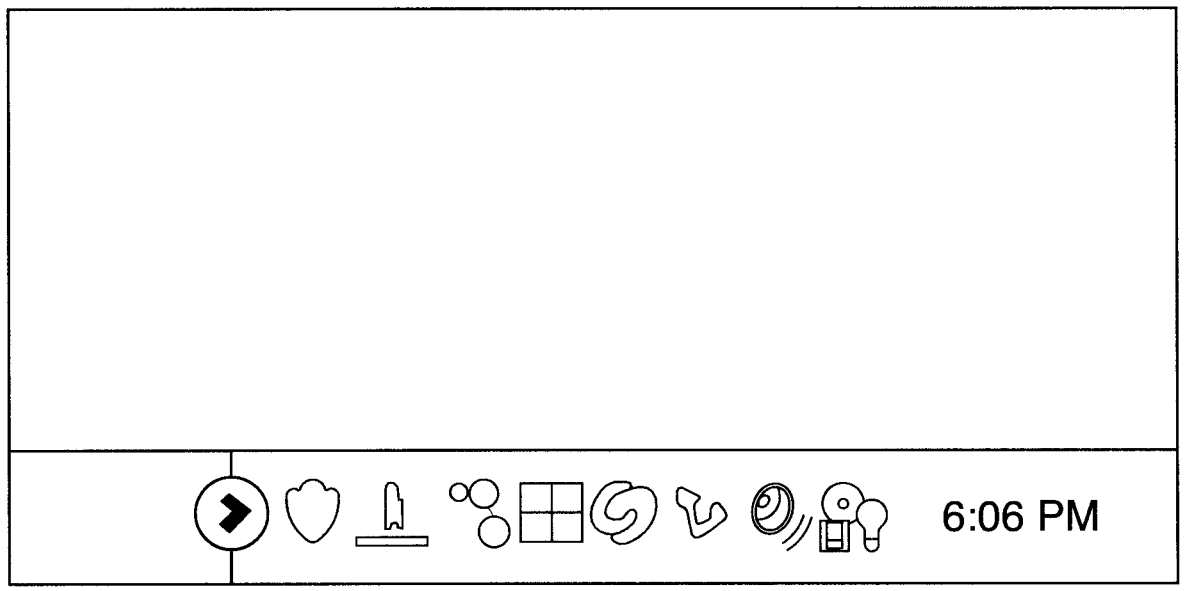
Figure 30:
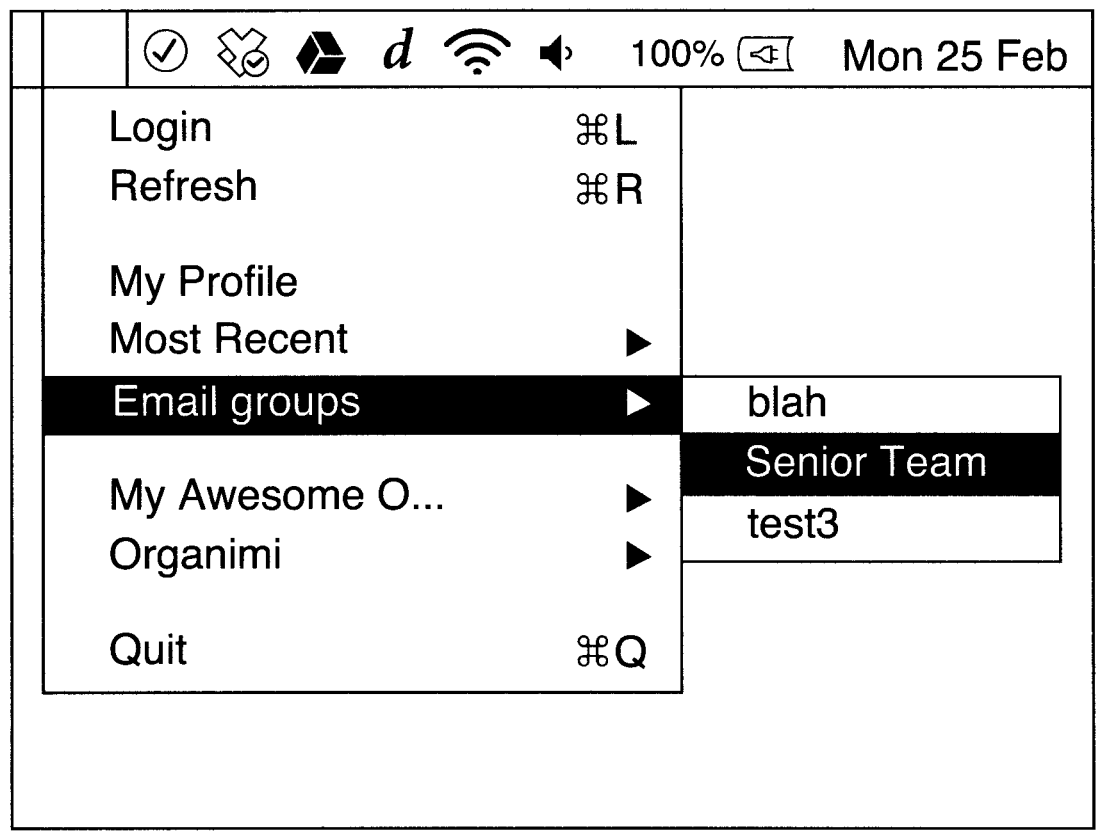
Figure 32:
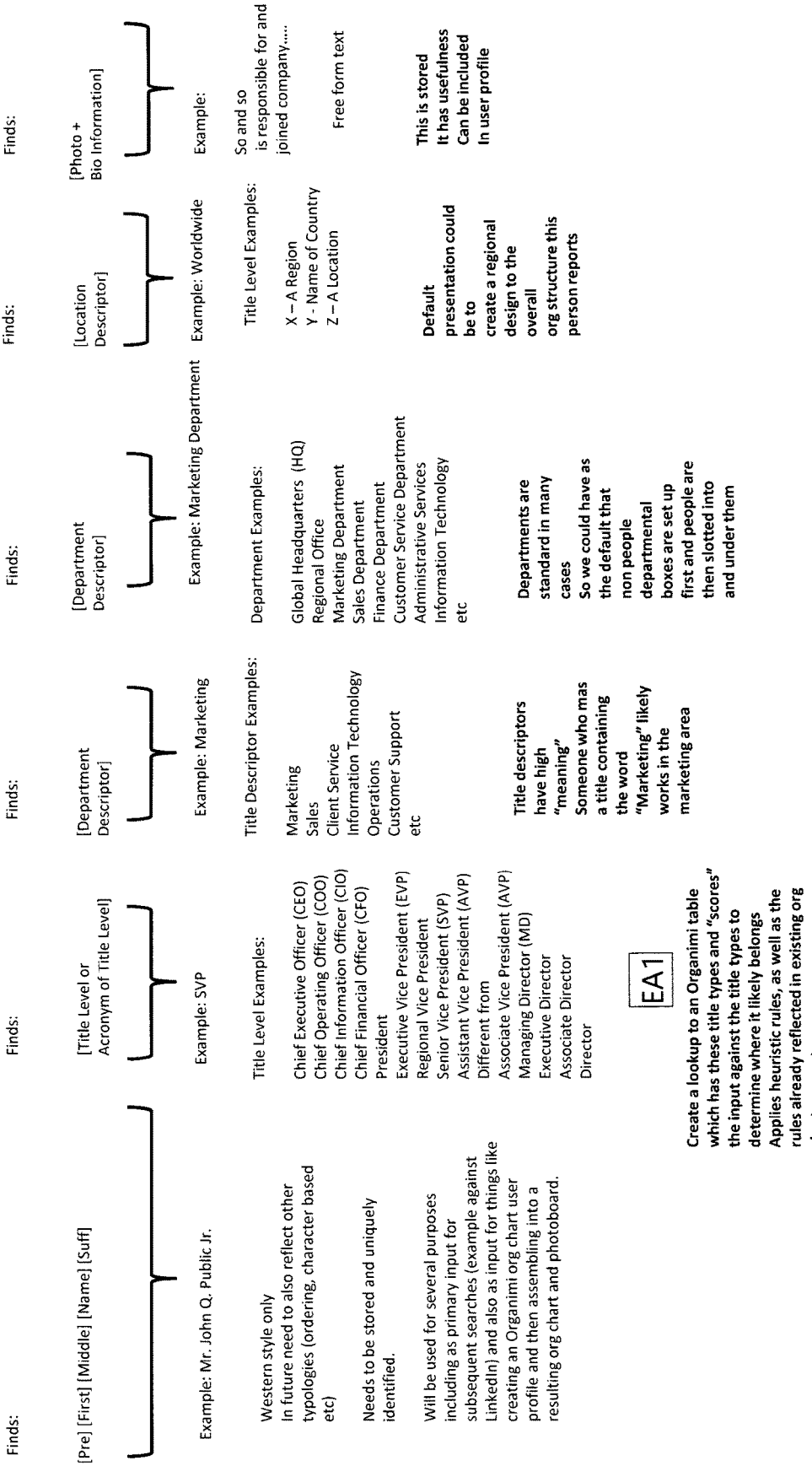
Figure 33:
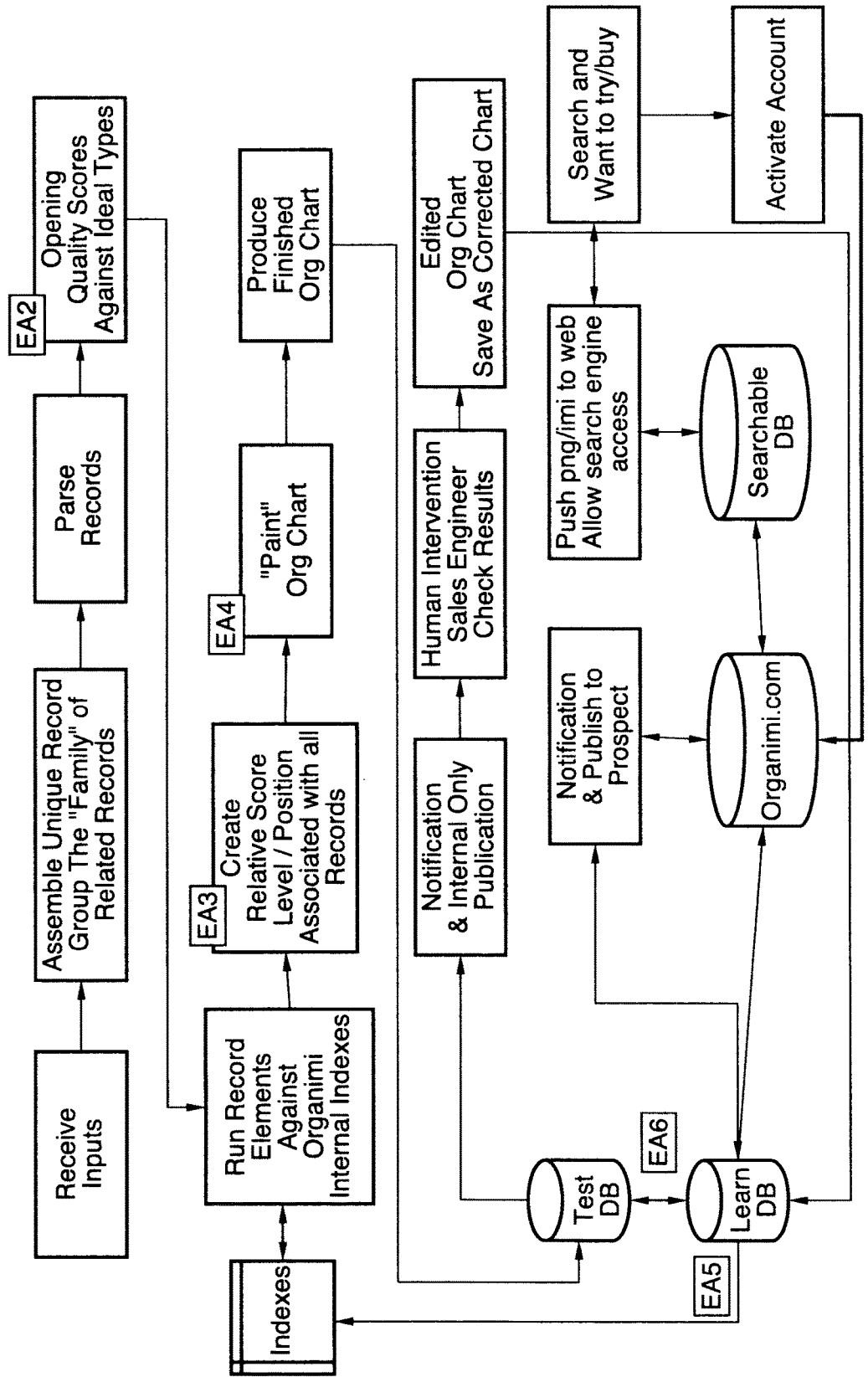
Figure 34:
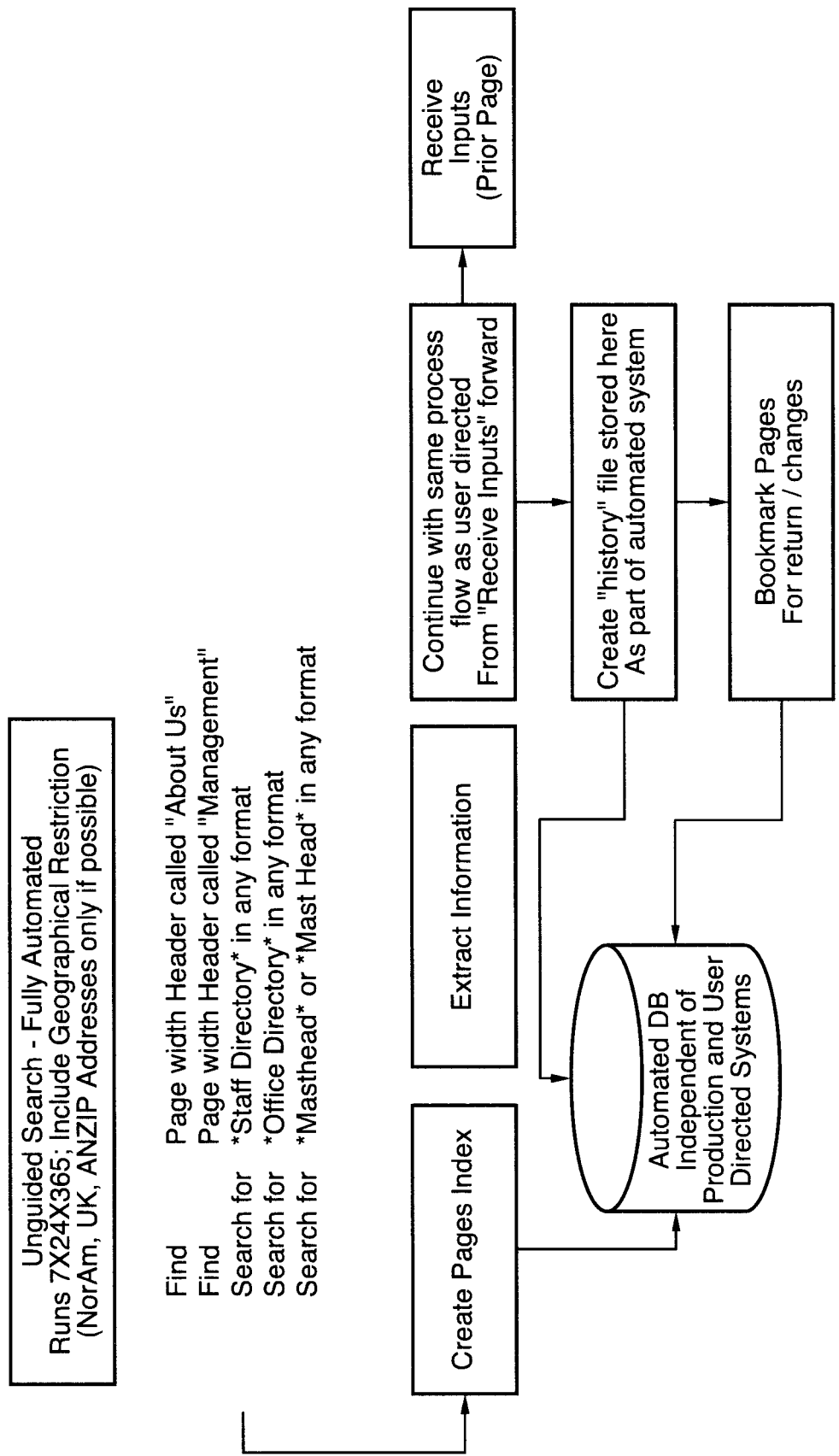
Figure 35:
Figure 36:
Figure 37:

FIGS. 28, 29, and 30 are screen captures illustrating tools for quickly accessing dynamically managed contact lists in accordance with an embodiment of the invention. Modern organizations often have a difficult time keeping track of email contact lists, both internal to the organization and across multiple organizations. All modern operating system desktop environments have an area that is by default always visible to the user, which allows quick access to frequently used or important tools, such as time, speaker volume, and network connection. On the Mac™ OS, this is often called the "status bar", as shown in FIG. 28. On Windows™ operation systems, this is called the "system tray", as shown in FIG. 29. For convenience, this area will be referred to as the status tray. According to one embodiment, the present invention provides a set of cloud-based services, one of which provides for the creation and management of email contact lists through a web user interface. These contact lists are of various types described below. Changes to organization structure are automatically reflected in contact list constituents.

According to one embodiment, a status tray application module 331 is provided. This application allows a member of an organization to access custom built and dynamically managed email contact lists from the status tray of a workstation desktop. It may be a locally installed application that places an icon in the status tray, which upon a user click event, shows previously constructed contact lists. When a contact list is accessed, the default email agent on the computer will be brought to the foreground with email recipients already filled in. This is shown in FIG. 30. There are several email contact list types. According to one embodiment, two types of email contact lists are included in the application as follows: User built—the user creates and populates the contact list by enrolling (a) organization members independent of their roles, and (b) organization members as occupants of certain roles, if another member later occupies those roles, they will automatically become enrolled in the contact list; and, Position based—contact lists derived from a user's role position in charts, such as (a) user's direct reports list, (b) user's full reports list, (c) user's management chain, (d) user's boss's direct report list, and (e) user's boss's full reports list.

FIGS. 31 to 38 are screen captures and block diagrams illustrating a scrapper application module 331 in accordance with an embodiment of the invention. A scraper is a web spider bot that systematically browses the Internet for information of purpose. According to one embodiment, a set of cloud-based services are provided, one of which offers the indexing of organizations for connection, communication, and collaboration among members of an organization as well as across multiple organizations. Outbound communication is a marketing and sales strategy, in which partially populated organizations are modeled and made available as a part of the sales effort.

According to one embodiment, a scraper engine module 331 is provided. The application engine underlying the scraper may provide the ability to crawl the Internet, initiated either automatically or on demand, to gather organization membership information from public sources and persist results into a database. Results may be filtered and processed in various stages: basic information—member name, role title, department, location, email, phone; role normalization—use a set of heuristics to apply language parsing on role titles into a set of standardized titles; and, structure implication—infer organization structure from standardized titles, and build organizational charts from them based on department and location (accuracy need not be a primary goal at this point). Data sources may be public. The law of large numbers plays a major role both in a marketing/sales strategy and in scraping strategies. These are described below.

According to one embodiment, a marketing/sales strategy method is provided. Once organizational charts are built, outbound communication may begin. Each crawled organization becomes a prospect. The sales process may follow a step-by-step guideline as follows: exposure—connect the prospect to the public organizational charts, either directly through communication or indirectly through channel partners and virality effects; communication—directly communicate with prospects by traditional sales methodologies including (a) inaccurate information may assist the process by hypothesis that companies may be more interested to reach out and correct inaccurate information in the public space, and (b) law of large numbers—if a very large number organizations are contacted, small response rate can be amplified by scale; and, viral marketing—build a public directory of organizations to facilitate fast scaling.

According to one embodiment, scrape strategies methods are provided. Data sources may be public. Examples of such sources include: Search engine results—On Google Search™, a search for "staff directory" ontario yields 314 k results, a search for "masthead" ontario yields 1.67 million results, only a small percentage of these results need to be mined and parsed into useful data to yield significant value; and, Social networks—LinkedIn™ provides public information on a majority of industry professionals as well as company member associations, data from these services may be used for secondary consolidation. To handle challenges arising from format variety across different sources, the following strategy may be used: sample the first 100 entries and develop a scraping strategy that works for them; and, hypothesize that at least 33% of all search results may be handled by this point.

The above embodiments may contribute to an improved method for generating an electronic organization chart 1100 and may provide one or more advantages. First, the method allows for the gathering of data for the chart 1100 from multiple locations. Second, the method allows for changes in the chart 1100 over time to be viewed.

Aspects of the above described method may be summarized with the aid of a flowchart.

Figure 25:
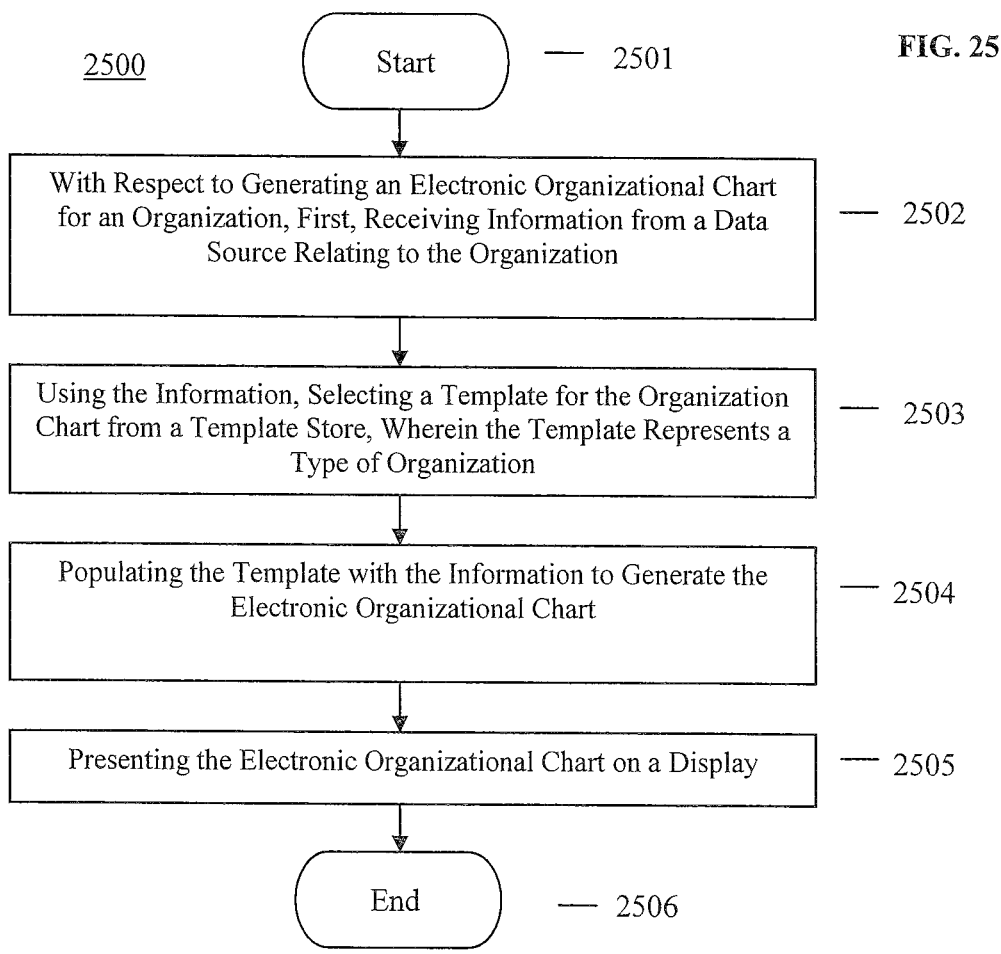
FIG. 25 is a flow chart illustrating operations of modules within a data processing system for generating an electronic organizational chart representing an organization, in accordance with an embodiment of the invention.

FIG. 25 is a flow chart illustrating operations 2500 of modules 321, 331 within a data processing system (e.g., 300) for generating an organizational chart 1100 for an organization, in accordance with an embodiment of the invention.

At step 2501, the operations 2500 start.

At step 2502, information from a data source 1710 relating to the organization is received.

At step 2503, using the information, a template 1750 is selected for the organization chart 1100 from a template store 332, 1750, wherein the template 1750 represents a type of organization 1804.

At step 2504, the template 1750 is populated with the information to generate the electronic organizational chart 1100.

At step 2405, the electronic organizational chart 1100 is presented on a display 340.

At step 2506, the operations 2500 end.

In the above method, the information may include the type of organization. The method may further include inviting one or more entities to join the organization. The method may further include updating the electronic organizational chart 1100 with information relating to the one or more entities to generate an updated electronic organizational chart 1200. And, the method may further include sequentially presenting the electronic organizational chart 1100 and the updated electronic organizational chart 1200 on the display 340.

According to one embodiment, each of the above steps 2501-2506 may be implemented by a respective software module 331. According to another embodiment, each of the above steps 2501-2506 may be implemented by a respective hardware module 321. According to another embodiment, each of the above steps 2501-2506 may be implemented by a combination of software 331 and hardware modules 321.

While this invention is primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium or product including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 can be contained in a data carrier product according to one embodiment of the invention. This data carrier product can be loaded into and run by the data processing system 300. In addition, the sequences of instructions which when executed cause the method described herein to be performed by the data processing system 300 can be contained in a computer program or software product according to one embodiment of the invention. This computer program or software product can be loaded into and run by the data processing system 300. Moreover, the sequences of instructions which when executed cause the method described herein to be performed by the data processing system 300 can be contained in an integrated circuit product (e.g., a hardware module or modules 321) which may include a coprocessor or memory according to one embodiment of the invention. This integrated circuit product can be installed in the data processing system 300.

The embodiments of the invention described above are intended to be exemplary only. Those skilled in the art will understand that various modifications of detail may be made to these embodiments, all of which come within the scope of the invention.

What is claimed is:

1. A method for generating an electronic organizational chart for an organization, the organization including one or more participants, the method comprising:

using a processor, receiving information from a data source relating to the organization;

using the information, selecting a template for the electronic organizational chart from a template store, wherein the template represents a type of organization;

populating the template with the information to generate the electronic organizational chart;

highlighting portions of the electronic organizational chart corresponding to ones of the one or more participants located at an address;

indicating on the electronic organizational chart associations between ones of the one or more participants and one or more other organizations by embedding respective electronic organizational charts for the one or more other organizations within the electronic organization chart; and, presenting the electronic organizational chart on a display;

wherein the type of organization defines an organizational structure of the organization; and, wherein the type of organization is one or more of a company, a partnership, a team, and a charity.

2. The method of claim 1 wherein the information includes the type of organization.

3. The method of claim 1 and further comprising inviting one or more entities to join the organization.

4. The method of claim 3 and further comprising updating the electronic organizational chart with information relating to the one or more entities to generate an updated electronic organizational chart.

5. The method of claim 4 and further comprising sequentially presenting the electronic organizational chart and the updated electronic organizational chart on the display.

6. A system for generating an electronic organizational chart for an organization, the organization including one or more participants, the system comprising:

a processor coupled to memory and a display; and, at least one of hardware and software modules within the memory and controlled or executed by the processor, the modules including:

a module for receiving information from a data source relating to the organization;

a module for, using the information, selecting a template for the electronic organizational chart from a template store, wherein the template represents a type of organization;

a module for populating the template with the information to generate the electronic organizational chart;

a module for highlighting portions of the electronic organizational chart corresponding to ones of the one or more participants located at an address;

a module for indicating on the electronic organizational chart associations between ones of the one or more participants and one or more other organizations by embedding respective electronic organizational charts for the one or more other organizations within the electronic organization chart; and, a module for presenting the electronic organizational chart on a display;

wherein the type of organization defines an organizational structure of the organization; and, wherein the type of organization is one or more of a company, a partnership, a team, and a charity.

7. The system of claim 6 wherein the information includes the type of organization.

8. The system of claim 6 and further comprising a module for inviting one or more entities to join the organization.

9. The system of claim 8 and further comprising a module for updating the electronic organizational chart with information relating to the one or more entities to generate an updated electronic organizational chart.

10. The system of claim 9 and further comprising a module for sequentially presenting the electronic organizational chart and the updated electronic organizational chart on the display.

11. A system operating on a computing device for creating an electronic organizational chart representing one or more organizations comprising at least one participant, the system comprising:
   an input device for receiving user input;
   a pre-defined template store comprising a plurality of pre-defined templates, each template representing a type of organization;
   a processor configured to select a pre-defined template based on organization information provided by the user, the processor adapted to extract the organization information from at least one data source and to create the electronic organizational chart; the processor further adapted to highlight portions of the electronic organizational chart corresponding to one or more participants located at an address; the processor further adapted to indicate on the electronic organizational chart associations between ones of the one or more participants and one or more other organizations by embedding respective electronic organizational charts for the one or more other organizations within the electronic organization chart;
   an output renderer component, for creating a visual representation of the created electronic organizational chart; and,
   an output device for outputting a visual representation of the electronic organizational chart;
   wherein the type of organization defines an organizational structure of the organization; and,
   wherein the type of organization is one or more of a company, a partnership, a team, and a charity.

12. The system of claim 11, wherein the organization information provided by the user is an organization name.

13. The system of claim 11, further comprising an organizational type selector for allowing the user to select the type of organization for which the electronic organizational chart is generated.

14. The system of claim 11, further comprising a participant module for creating and editing participant profiles, the participant creation module configured to create associations between participants and organizations.

15. The system of claim 14, wherein the participant module may create associations between a participant and several organizations.

16. The system of claim 15, wherein the associations may be selected from the group comprising: employee, member, contractor, owner and volunteer.

17. The system of claim 16, wherein associations may be defined between participants within an organization and between participants in multiple organizations.

18. The system of claim 11, further comprising a participant recognition tool for receiving a digital image of a participant, determining the participant that most closely matches the digital image, and displaying the profile of the matched participant on the output device.

19. The system of claim 18, wherein the participant recognition tool further for displaying context to the user based on the location of the device providing the digital image of the participant.

20. The system of claim 19, wherein the context includes the current location of the participant associated with the digital image.

21. The system of claim 11, wherein the output renderer component further for generating a dynamic visual representation of an organizational chart over a preselected timeframe of the changes that occurred within a given organization.

22. The system of claim 21, wherein the preselected timeframe is based on an input provided by the user.

23. The system of claim 21, wherein the preselected timeframe is the time between successive log-ins to the system by the user.

24. The system of claim 11, further comprising an invitation tool for inviting entities to join an organization.

25. The system of claim 24, wherein the entities invited are prompted to confirm information provided by the user.

26. A method for creating an electronic organizational chart representing one or more organizations on a computing device having at least one processor, the one or more organizations comprising at least one participant, the method comprising:
   receiving user input at an input device;
   accessing at least one data source comprising information relating to an organization;
   selecting at least one predefined template from a predefined template store, wherein each predefined template represents a type of organization;
   creating the electronic organizational chart using an organization chart generator, the organization chart generator configured to extract the information from the at least one data source;
   highlighting portions of the electronic organizational chart corresponding to one or more participants located at an address;
   indicating on the electronic organizational chart associations between one or more participants and one or more other organizations by embedding respective electronic organizational charts for the one or more other organizations within the electronic organization chart;
   creating a visual representation of the created electronic organizational chart using an output rendering component; and,
   displaying the visual representation of the electronic organizational chart at an output device;
   wherein the type of organization defines an organizational structure of the organization; and,
   wherein the type of organization is one or more of a company, a partnership, a team, and a charity.

27. The method of claim 26, wherein the predefined template is selected based on the user inputting the type of organization at the input device.

28. The method of claim 26, further comprising inviting one or more entities to become new participants in the organization.

29. The method of claim 28, further comprising creating an updated visual representation of the electronic organizational chart as the new participants accept invitations.

30. The method of claim 26, further comprising creating a dynamic visual representation of changes in the organization within a time range provided by the user.

* * * * *